(12) United States Patent
Yun et al.

(10) Patent No.: US 10,531,469 B2
(45) Date of Patent: Jan. 7, 2020

(54) APPARATUS AND METHOD FOR SUPPORTING MIXED NUMEROLOGY IN WIRELESS COMMUNICATION SYSTEM

(71) Applicant: Samsung Electronics Co., Ltd., Gyeonggi-do (KR)

(72) Inventors: Yeohun Yun, Hwaseong-si (KR); Chanhong Kim, Suwon-si (KR); Jongbu Lim, Seoul (KR); Hyunseok Ryu, Yongin-si (KR); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 15/703,897

(22) Filed: Sep. 13, 2017

(65) Prior Publication Data
US 2018/0092084 A1 Mar. 29, 2018

(30) Foreign Application Priority Data
Sep. 29, 2016 (KR) .................. 10-2016-0125716

(51) Int. Cl.
*H04W 72/04* (2009.01)
*H04L 5/00* (2006.01)

(52) U.S. Cl.
CPC ......... *H04W 72/048* (2013.01); *H04L 5/0005* (2013.01)

(58) Field of Classification Search
None
See application file for complete search history.

(56) References Cited

U.S. PATENT DOCUMENTS

| 8,457,101 | B2 | 6/2013 | Noh et al. |
| 2007/0116094 | A1 | 5/2007 | Parts et al. |
| 2009/0175230 | A1 | 7/2009 | Callard et al. |
| 2009/0225824 | A1* | 9/2009 | Noh ............... H04L 5/0048 375/240 |
| 2013/0021976 | A1* | 1/2013 | Yang ............... H04L 27/2663 370/328 |

(Continued)

FOREIGN PATENT DOCUMENTS

WO 2016028380 A1 2/2016

OTHER PUBLICATIONS

"LTE; Evolved Universal Terrestrial Radio Access (E-UTRA); Physical Layer Procedures—Sections 6-9.3"; 3GPP TS 36.213 V13.2.0; Jun. 2016; 210 pages.

(Continued)

*Primary Examiner* — Saumit Shah

(57) ABSTRACT

The present disclosure relates to a pre-$5^{th}$-generation (5G) or 5G communication system to be provided for supporting higher data rates beyond $4^{th}$-generation (4G) communication system such as long term evolution (LTE). Disclosed is a method for operating a BS for supporting mixed numerology in a wireless communication system. The method includes: generating a first signal for a first group and a second signal for a second group according to different configurations; and transmitting the first signal through a first channel allocated for the first group and the second signal through a second channel allocated for the second group.

18 Claims, 34 Drawing Sheets

(56) References Cited

U.S. PATENT DOCUMENTS

| | | |
|---|---|---|
| 2014/0050206 A1 | 2/2014 | Seo et al. |
| 2015/0304079 A1 | 10/2015 | Kim et al. |
| 2017/0331613 A1* | 11/2017 | Ly .................... H04L 7/0008 |
| 2018/0049169 A1* | 2/2018 | Lin .................... H04L 5/0051 |
| 2018/0212698 A1* | 7/2018 | Sun .................... H04L 5/0053 |
| 2019/0149283 A1* | 5/2019 | Tang .................... H04W 72/04 |

OTHER PUBLICATIONS

International Search Report and Written Opinion for International Application No. PCT/KR2017/010162, dated Jan. 15, 2018. (13 pages).

* cited by examiner

FIG.12H

APPARATUS AND METHOD FOR SUPPORTING MIXED NUMEROLOGY IN WIRELESS COMMUNICATION SYSTEM

CROSS-REFERENCE TO RELATED APPLICATION(S) AND CLAIM OF PRIORITY

This application is related to and claims priority to Korean Application Serial No. 10-2016-0125716 filed on Sep. 29, 2016, the contents of which are incorporated herein by reference.

TECHNICAL FIELD

The present disclosure relates generally to a wireless communication system, and more particularly to an apparatus and a method for supporting mixed numerology in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) System."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

To address the above-discussed deficiencies, it is a primary object to provide an apparatus and a method for supporting various numerologies in a wireless communication system.

The present disclosure provides an apparatus and a method for operating synchronization channels and broadcasting channels based on various numerologies in a wireless communication system.

The present disclosure provides an apparatus and a method for operating resources in consideration of various numerologies in a wireless communication system.

The present disclosure provides an apparatus and a method for providing information on central frequencies of groups that support different numerologies in a wireless communication system.

The present disclosure provides an apparatus and a method for providing information regarding frame boundaries of groups that support different numerologies in a wireless communication system.

The present disclosure provides an apparatus and a method for indexing Resource Blocks (RBs) of groups that support different numerologies in a wireless communication system.

In accordance with an aspect of the present disclosure, a method for operating a Base Station (BS) in a wireless communication system is provided. The method includes: generating a first signal for a first group and a second signal for a second group according to different configurations; and transmitting the first signal through a first channel allocated for the first group and the second signal through a second channel allocated for the second group.

In accordance with another aspect of the present disclosure, a method for operating a terminal in a wireless communication system is provided. The method includes: receiving a first signal among the first signal for a first group and a second signal for a second group that are generated according to different configurations; and identifying a system bandwidth of the first group and information on a frame based on the first signal.

In accordance with another aspect of the present disclosure, a base station (BS) in a wireless communication system is provided. The BS apparatus includes: at least one processor configured to generate a first signal for a first group and a second signal for a second group according to different configurations; and a transceiver configured to transmit the first signal through a first channel allocated for the first group and the second signal through a second channel allocated for the second group.

In accordance with another aspect of the present disclosure, a terminal in a wireless communication system is provided. The terminal apparatus includes: a transceiver configured to receive a first signal among the first signal for a first group and a second signal for a second group that are generated according to different configurations; and at least one processor configured to identify a system bandwidth of the first group and information on a frame based on the first signal.

The different configurations include different subcarrier intervals. The first signal includes a broadcasting containing at least one of information regarding a central frequency of the system bandwidth of the first group or information regarding a frame boundary of the first group.

An apparatus and a method according to various embodiments of the present disclosure simultaneously support various numerologies in one system by operating synchronization channels and broadcasting channels according to whether or not groups that support various numerologies share a system bandwidth.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12D to 12I illustrate examples of independent indexing for resource blocks to which the shift index is applied in the wireless communication system according to various embodiments of the present disclosure.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for supporting mixed numerology in a wireless communication system.

The terms referring to parameters for determining physical attributes of a frame used in the following description, the terms referring to a signal, the terms referring to a channel, the terms referring to control information, the terms referring to a network entity, and the terms referring to elements of a device are used only for convenience of the description. Accordingly, the present disclosure is not limited to the following terms, and other terms having the same technical meaning may be used.

In the present disclosure, "numerology" is used as the term that means a parameter or a set of parameters related to the structure of a physical signal. Numerology may indicate at least one of various parameters that causes a change in a physical signal such as subcarrier spacing, symbol duration, cyclic prefix (CP) duration, fast Fourier transform (FFT), sampling rate, subframe length, and frame length. Accordingly, "mixed numerology" refers to a situation where various physical structures coexist, and "supporting mixed numerology" means that one base station or system provides different physical structures. Therefore, "numerology" may be referred to as "signal configuration," "physical layer configuration," "frame configuration," "configuration," "signal structure," "physical layer structure," "frame structure," or another name having a technical meaning equivalent thereto.

Further, although the present disclosure describes various embodiments based on the terms used in some communication standards (for example, long term evolution (LET) and LTE-advanced (LTE-A) systems), they are only examples for the description. Various embodiments of the present disclosure may be easily modified and applied to other communication systems.

Figure 1:
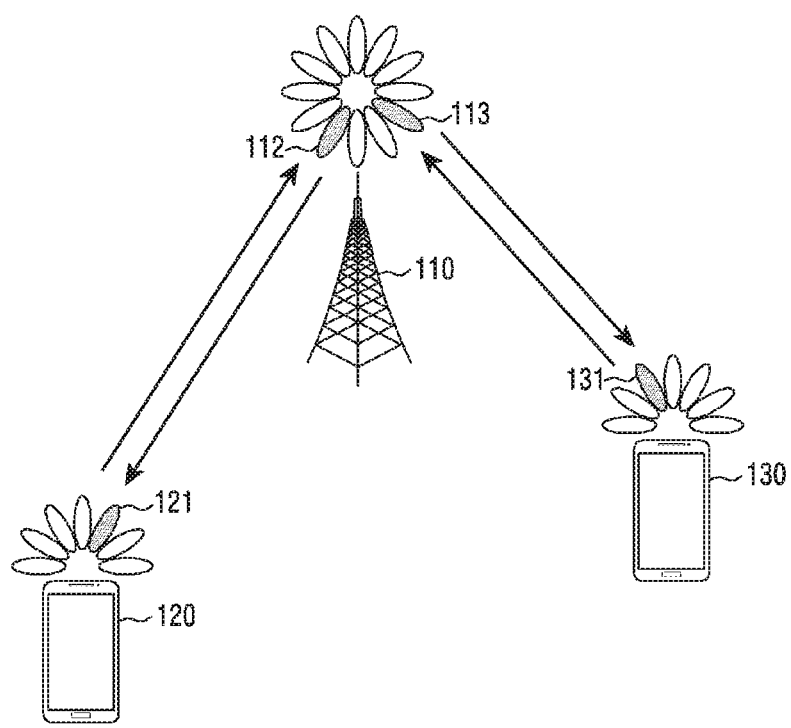
FIG. 1 illustrates a wireless communication system according to various embodiments of the present disclosure.

FIG. 1 illustrates a wireless communication system according to various embodiments of the present disclosure. In FIG. 1, a Base Station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure.

Figure 2:
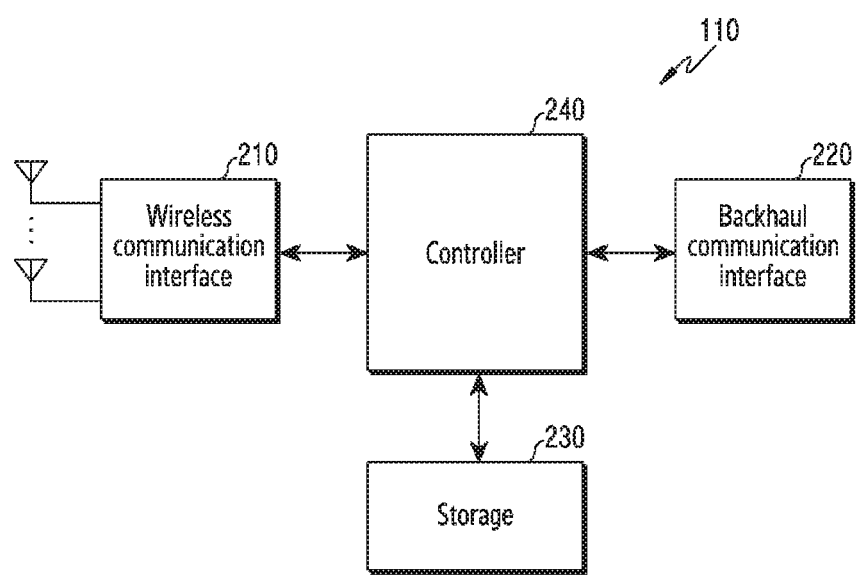
FIG. 2 illustrates a base station (BS) in the wireless communication system according to various embodiments of the present disclosure.

FIG. 2 illustrates the BS in the wireless communication system according to various embodiments of the present disclosure. The term "-unit" or "-er" used hereinafter may refer to the unit for processing at least one function or operation and may be implemented in hardware, software, or a combination of hardware and software.

Referring to FIG. 2, the BS 110 may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal. In addition, the wireless communication interface 210 up-converts the baseband signal into an Radio Frequency (RF) band signal, transmits the converted signal through an antenna, and then down-converts the RF band signal received through the antenna into the baseband signal.

To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements. On the hardware side, the wireless communication interface 210 may include a digital unit and an analog unit, and the analog unit may include a plurality of sub-units according to operation power, operation frequency, and the like.

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS 110 into physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. To this end, the controller 240 may include at least one processor. According to various embodiments, the controller 240 supports a plurality of numerologies and operates a plurality of groups classified based on numerology or a service. The controller 240 operates a synchronization channel and a broadcasting channel for each of the groups. Further, when the groups share the same band, the controller 240 may indicate resources through proper resource indexing/numbering. For example, the controller 240 may control the BS 110 to perform the operations described below according to various embodiments.

Figure 3:
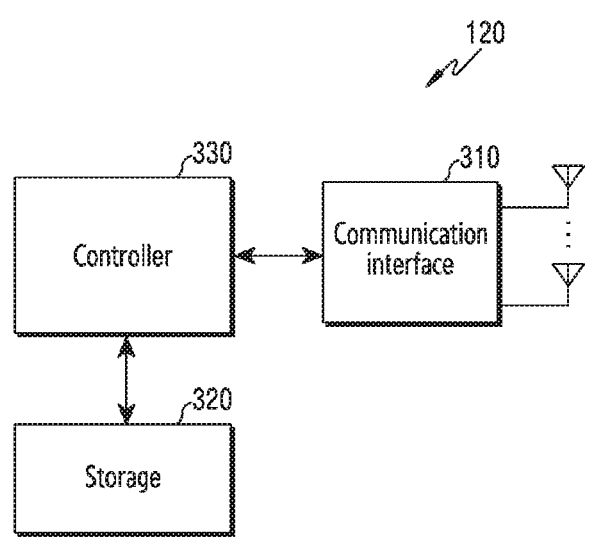
FIG. 3 illustrates a terminal in the wireless communication system according to various embodiments of the present disclosure.

FIG. 3 illustrates the terminal in the wireless communication system according to various embodiments of the present disclosure. The term "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. To this end, the controller 330 may include at least one processor or microprocessor, or may play the part of the processor. Further, the part of the communication interface 310 or the controller 330 may be referred to as a communication processor (CP). Particularly, according to various embodiments, the controller 330 makes a control to communicate with the BS 110, which supports a plurality of numerologies. The controller 330 identifies a system bandwidth, a central frequency, a frame boundary for a group to which the terminal 120 belongs through a signal and information received through a synchronization channel and a broadcasting channel. Further, when groups share the same band, the controller 330 analyzes information indicating resources through proper resource indexing. For example, the controller 330 may control the terminal to perform the operations described below according to various embodiments.

Figure 4:
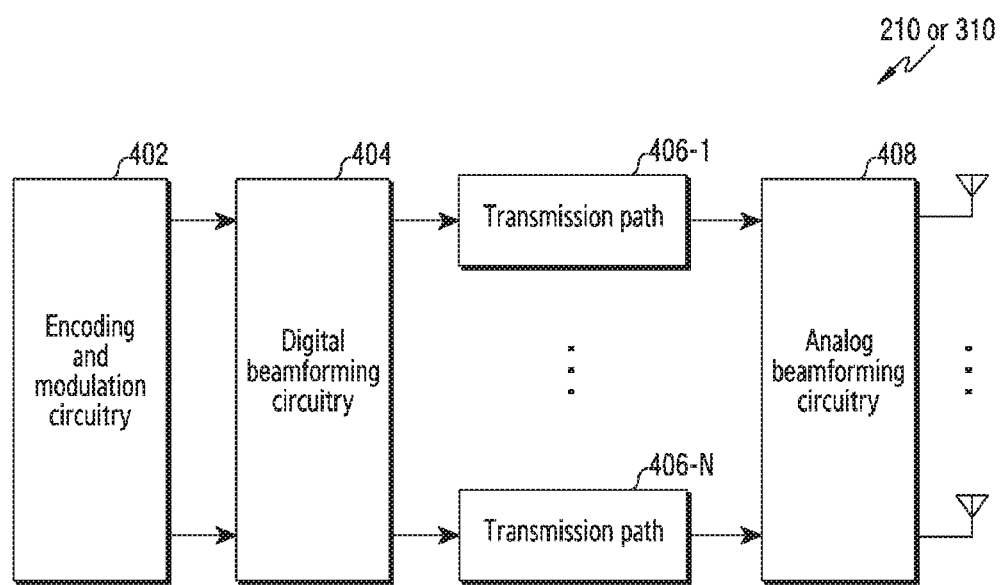
FIG. 4 illustrates a communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform own calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between e plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Recently, the 3rd-generation partnership project (3GPP) standards group has discussed a new radio access technology. The new radio access technology aims to support various services, for example, enhanced mobile broadband (eMBR), ultra-reliable low-latency communication (URLLC), and massive machine-type communication (mMTC). In order to support various services, evolution to accept all of the different requirements that various services need, such as multi-numerology, flexibility, and forward compatibility, is necessary. Particularly, the coexistence of different numerologies means that it is impossible to simplify the structure of the system. Accordingly, a frame structure for efficiently supporting various numerologies and a method for operating a synchronization signal and frequency resources are needed.

Therefore, the system according to various embodiments supports a plurality of numerologies. That is, the system may support various configurations for a physical layer. For example, the system may apply various kinds of subcarrier spacing. Accordingly, the BS may transmit or receive signals generated according to different numerologies. At this time, the signals generated according to the different numerologies may be multiplexed within one subframe, one frame, or one superframe. Further, the signals generated according to the different numerologies may be divided on a frequency axis and a time axis. In addition, the signals generated according to the different numerologies may overlappingly occupy the same time-frequency resources. That is, the signals based on the different numerologies may coexist in various ways.

A plurality of groups may be defined based on numerology. Traffic, a bearer, and a connection provided by each group share a synchronization channel and a broadcasting channel, and each group supports one or more numerologies. Further, each group is defined so as to provide one or more services. That is, in the present disclosure, the "group" is the unit for dividing the same type of numerologies having different values, and may be the unit for dividing services, depending on the case. When one group supports a plurality of numerologies, one of the plurality of numerologies is defined as the default numerology for one group. Accordingly, a "group" may be referred to as a "numerology set," a "configuration set," a "profile," a "service group," a "service set," or another name having a technical meaning equivalent thereto.

Since different numerology is applied to each group, the terminal analyzes the signal based on the numerology of a group corresponding to the service that the terminal desires. In general, the terminal turns on power, searches for a frequency, detects a synchronization signal, and then acquires system information (for example, a master information block (MIB) and a system information block (SIB)) through a broadcasting signal. That is, the synchronization signal and the broadcasting signal may be detected and analyzed without advance information, and thus are transmitted through a synchronization channel and a broadcasting channel in a pre-appointed structure. The broadcasting channel may be referred to as a "physical broadcast channel (PBCH)." When the detection of the synchronization channel and the broadcasting channel is not easy, access by the terminal may result in an error. Accordingly, a method of effectively operating the synchronization channel and the broadcasting channel in an environment where various numerologies coexist is required.

Figure 5A:
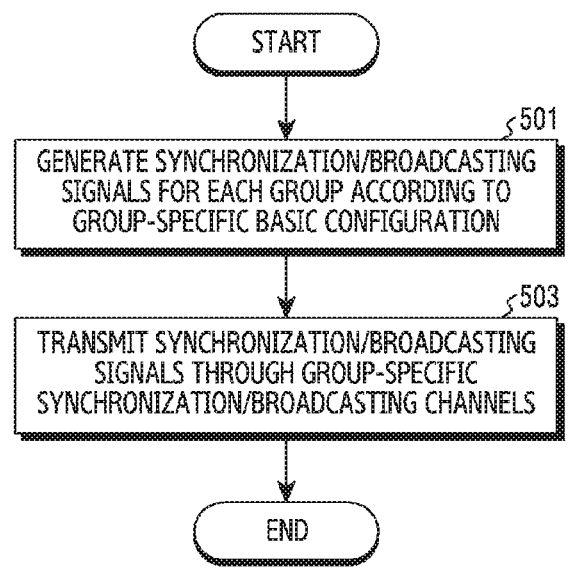
FIG. 5A illustrates an operation method of the BS in the wireless communication system according to various embodiments of the present disclosure.

FIG. 5A illustrates an operation method of the BS in the wireless communication system according to various embodiments of the present disclosure. FIG. 5A illustrates an operation method of the BS 110.

Referring to FIG. 5A, in step 501, the BS generates a synchronization/broadcasting signal for each group according to a group-specific basic configuration. The configuration includes numerology, for example, subcarrier spacing. That is, the BS may generate a synchronization signal and a broadcasting signal of a first group based on basic subcarrier spacing of the first group, and may generate a synchronization signal and a broadcasting signal of a second group based on basic subcarrier spacing of the second group. At this time, each broadcasting signal may include at least one of information on a system bandwidth, information on a central frequency, or information on a frame boundary.

In step 503, the BS transmits synchronization signals and broadcasting signals through a group-specific synchronization channel and broadcasting channel. At this time, synchronization/broadcasting channels of groups may or may not share a system bandwidth. When the system bandwidth is shared, the synchronization/broadcasting channels of the groups may be divided on a time axis or a frequency axis. Further, the synchronization signal and the broadcasting signal may be transmitted together within one section (for example, subframe) or only one of the synchronization signal and the broadcasting signal may be transmitted within one section.

Figure 5B:
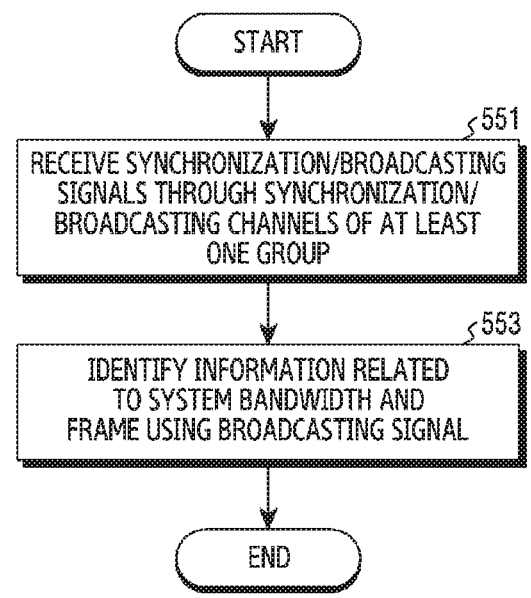
FIG. 5B illustrates an operation method of the terminal in the wireless communication system according to various embodiments of the present disclosure.

FIG. 5B illustrates an operation method of the terminal in the wireless communication system according to various embodiments of the present disclosure. FIG. 5B shows an operation method of the terminal 120.

Referring to FIG. 5B, in step 551, the terminal receives a synchronization signal and a broadcasting signal through a synchronization channel and a broadcasting channel of at least one group. The synchronization channel and the broadcasting channel may be analyzed according to the basic configuration of the corresponding group, that is, basic numerology. Each broadcasting signal may include at least one of information on a system bandwidth, information on a central frequency, or information on a frame boundary.

In step 553, the terminal identifies the system bandwidth and frame-related information based on the broadcasting signal. The frame-related information may include at least one of information on the central information or the information on the frame boundary. That is, the terminal may identify at least one of the system bandwidth, the central frequency, and the frame boundary allocated for the corresponding group based on information included in the broadcasting signal.

Through the procedure illustrated in FIGS. 5A and 5B, the BS and the terminal may transmit/receive synchronization signals and broadcasting signals of groups that support different configurations. Further, the terminal detects the synchronization signal and decodes the broadcasting signal so as to acquire system information such as the system bandwidth of the corresponding group. According to various embodiments, the groups may or may not share the system bandwidth. According to various embodiments, the synchronization/broadcasting channels of the groups that share the system bandwidth may be divided on the frequency axis or the time axis. Hereinafter, each detailed embodiment will be described.

The scenario considered in the present disclosure may be divided into e following three cases. The first case corresponds to the case where groups share the system bandwidth, the second case corresponds to the case where groups do not share the system bandwidth, and the third case corresponds to the case where sharing and non-sharing of the system bandwidth coexist. Among them, the first case is further divided into three cases. The first case corresponds to the case where groups arrange synchronization/broadcasting channels on different frequency resources, the second case corresponds to the case where groups arrange synchronization/broadcasting channels on different time resources, and the third case corresponds to the case where the first case and the second case coexist.

Hereinafter, the case where groups share the system bandwidth and arrange the synchronization/broadcasting channels on different frequency resources will be described with reference to FIGS. 6A to 7B. The case where groups share the system bandwidth and arrange the synchronization/broadcasting channels on different time resources will be described with reference to FIGS. 8A to 8D. The case where groups share the system bandwidth and arrange the synchronization/broadcasting channels on different frequency resources and different time resources will be described with reference to FIG. 9. The case where groups do not share the system bandwidth will be described with reference to FIGS. 10A to 10F. The case where the sharing and the non-sharing of the system bandwidth coexist will be described with reference to FIG. 11.

Figure 6A:
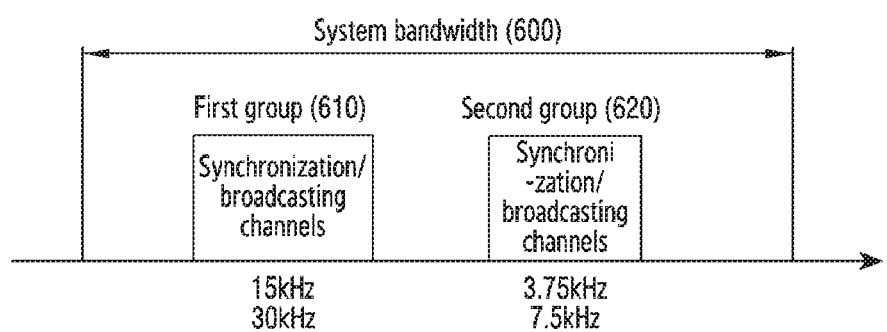
FIGS. 6A and 6B illustrate examples for distribution of synchronization/broadcasting channels divided on a frequency axis of groups that share a system bandwidth in the wireless communication system according to various embodiments of the present disclosure.
Figure 6B:
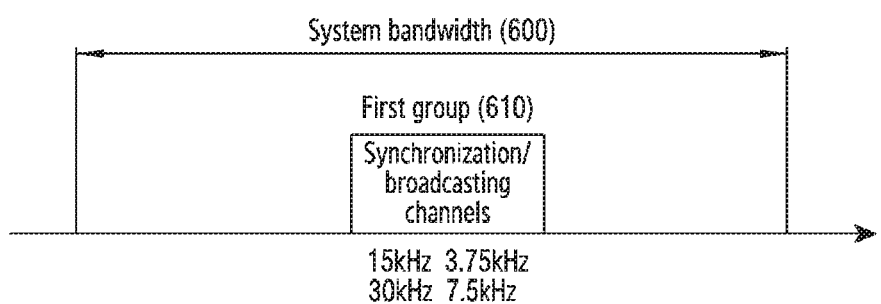

FIGS. 6A and 6B illustrate examples for the distribution of synchronization/broadcasting channels divided on the frequency axis of the groups that share the system bandwidth in the wireless communication system according to various embodiments of the present disclosure.

Referring to FIG. 6A, two groups 610 and 620 operate within one system bandwidth 600. The first group 610 supports subcarrier intervals of 15 kHz and 30 kHz, and has 15 kHz as a basic subcarrier interval between them. The second group 620 supports subcarrier intervals of 3.75 kHz and 7.5 kHz, and has 3.75 kHz as a basic subcarrier interval between them. At this time, the size of the synchronization/broadcasting channel of the first group 610 may be the same as or different from the size of the synchronization/broadcasting channel of the second group 620. The synchronization/broadcasting channel of the first group 610 and the synchronization/broadcasting channel of the second group 620 are arranged to be symmetrical with each other based on the central frequency of the system bandwidth 600.

Referring to FIG. 6B, one group may operate within one system bandwidth 600. The first group 610 supports subcarrier intervals of 15 kHz, 30 kHz, and 3.75 kHz, and has 15 kHz as a basic subcarrier interval among them. Accordingly, the terminal to receive a service from the first group 610, that is, the terminal belonging to the first group 610, detects the synchronization/broadcasting channel of the first group 610 according to the basic subcarrier interval of 15 kHz.

Figure 6C:
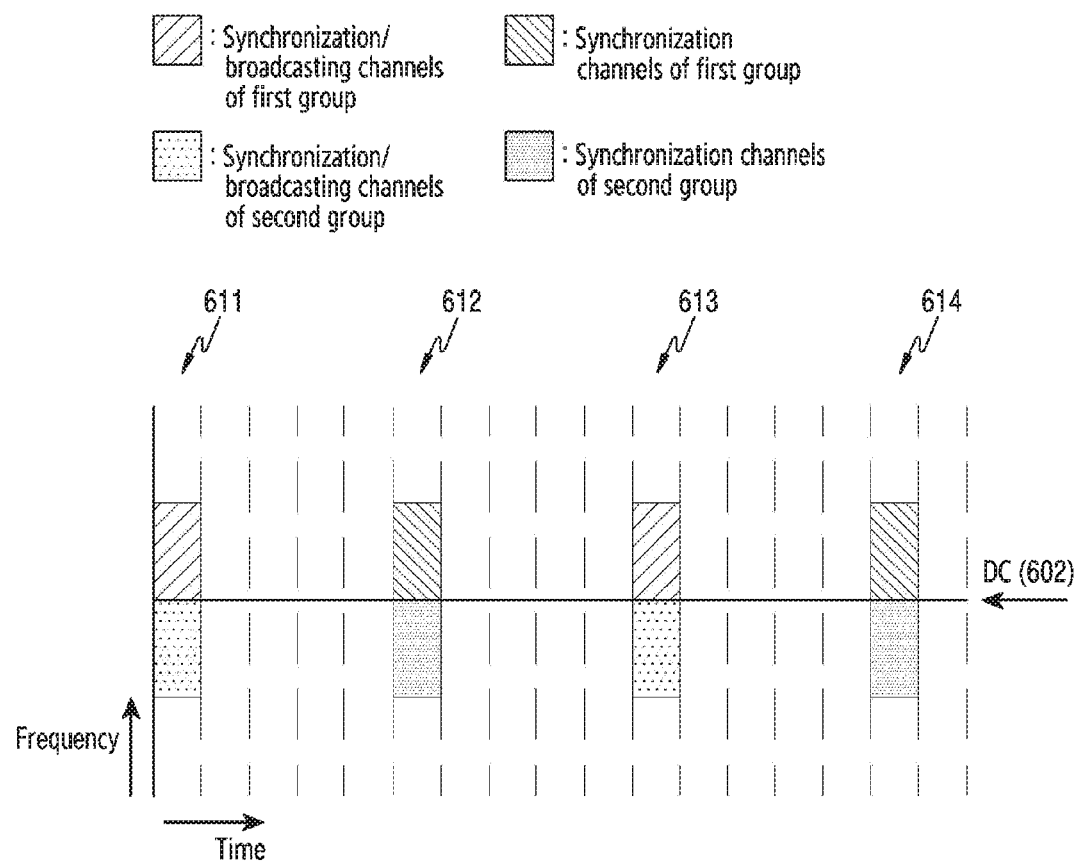
FIG. 6C illustrates an example for allocation of synchronization/broadcasting channels divided on the frequency axis of the groups that share the system bandwidth in the wireless communication system according to various embodiments of the present disclosure.

FIG. 6C illustrates an example for allocation of synchronization/broadcasting channels divided on the frequency axis of the groups that share the system bandwidth in the wireless communication system according to various embodiments of the present disclosure. Similar to FIG. 6A, FIG. 6C shows the case where two groups share the system bandwidth, which is symmetrical based on the central frequency.

Referring to FIG. 6C, synchronization channels and broadcasting channels of the two groups are periodically allocated. In section 611, the synchronization/broadcasting channel of the first group and the synchronization/broadcasting channel of the second group are allocated and symmetrically arranged based on the central frequency of the system bandwidth, that is, a direct current (DC) subcarrier 602. After four sections, in section 612, the synchronization channel of the first group and the synchronization channel of the second group are allocated and symmetrically arranged based on the DC subcarrier 602. Thereafter, the synchronization/broadcasting channels of the first group and the second group are allocated section 613, and the synchronization channels of the first group and the second group are allocated in section 614. That is, the synchronization channel and the broadcasting channel of each group may be periodically allocated, and the period of the synchronization channel may be shorter than the period of the broadcasting channel.

In FIG. 6C, each of the intervals 611 to 614 may be a subframe. In this case, each of the sections 611 to 614 includes a plurality of symbols. At this time, the synchronization signals or the broadcasting signals may be repeatedly transmitted through the plurality of symbols, and the synchronization signals or the broadcasting signals transmitted through the plurality of symbols may be transmission-beamformed using different transmission beams. That is, in each of the sections 611 to 614, the synchronization signals or the broadcasting signals may be swept.

When the channels are arranged near the DC subcarrier 602, as illustrated in FIG. 6C, it is advantageous reducing the overhead of frequency axis offset information. However, according to various embodiments, the synchronization/broadcasting channels may be arranged at different locations.

Figure 6D:
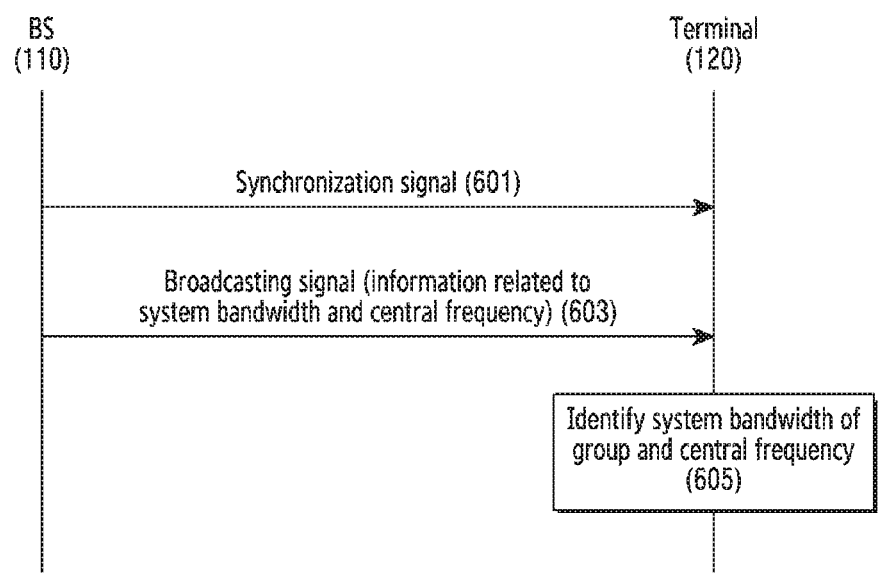
FIG. 6D illustrates signal exchange through broadcasting channels divided on the frequency axis of the groups that share the system bandwidth in the wireless communication system according to various embodiments of the present disclosure.

FIG. 6D illustrates signal exchange through broadcasting channels divided on the frequency axis of the groups that share the system bandwidth in the wireless communication system according to various embodiments of the present disclosure. FIG. 6D shows signaling between the BS 110 and the terminal 120.

Referring to FIG. 6D, in step 601, the BS 110 transmits the synchronization signals of at least one group. Accordingly, the terminal 120 detects the synchronization signals based on the basic configuration of the corresponding group, and acquires synchronization for the BS 110. At this time, the BS 110 may repeatedly transmit the synchronization signals through a plurality of transmission beams. The synchronization signals may be a set of a plurality of synchronization signals designed to have different purposes and structures.

In step 603, the BS 110 transmits the broadcasting signal. The broadcasting signal is transmitted through the broadcasting channel and includes system information. For example, the broadcasting signal may include information regarding the system bandwidth and the central frequency. At this time, the BS 110 may repeatedly transmit broadcasting signals through a plurality of transmission beams.

In step 605, the terminal 120 identifies the system bandwidth and the location of the central frequency. That is, based on the system information included in the broadcasting signal, the terminal 120 may identify the system bandwidth of the corresponding group and the location of the central frequency.

According to the embodiment described with reference to FIG. 6D, the BS may provide the terminal with information regarding the central frequency through the broadcasting channel. The information regarding the central frequency included in the broadcasting signal may be defined in various forms. For example, the information regarding the central frequency may be expressed by the distance between the central frequency of the system bandwidth and the center of the broadcasting channel, that is, an offset of the center of the broadcasting channel with respect to the central frequency. More specifically, the information regarding the central frequency expressed by the offset may be defined as Table 1, Table 2, Table 3, or Table 4 below.

TABLE 1 dl-PBCHoffset ENUMERATED {n0, n1,n2,n3,.....n10}
: Expressed by the number of Resource Blocks (RBs) of the basic TABLE 1-continued subcarrier
interval Referring to Table 1, the central location of the synchronization/broadcasting channel is expressed by the size of a resource block (RB) from the center of the system bandwidth. In Table 1, n0 denotes the case where there is no offset, that is, the case where the center of the synchronization/broadcasting channel is the center of the system bandwidth. According to the example of Table 1, there are 11 candidates, from n0 to n10. However, according to another embodiment, there may be 10 or fewer candidates or 12 or more candidates. Further, according to still another embodiment, n0 may be excluded. The resource block corresponds to a set of a predetermined number of subcarriers and is a unit of resource allocation. The resource block may be defined based on the number of subcarriers or based on a frequency bandwidth. For example, when the subcarrier interval is larger than 15 kHz, 12 subcarriers may be defined by one resource block. In another example, when the subcarrier interval is equal or smaller than 15 kHz, the size of the resource block may be defined by 180 kHz, or 12 subcarriers.

TABLE 2 dl-PBCHoffset ENUMERATED {n0, n1,n2,n3,.....n10, half RB shift bit}
: Expressed using number of RBs of basic subcarrier interval, and shift bit of 1
bit indicating half of RB size is added Referring to Table 2, the central location of the synchronization/broadcasting channel is expressed using the size of the resource block from the center of the system bandwidth and a shift bit. When an odd number of resource blocks (for example, 25 resource blocks) are included in the system bandwidth, it may be required to express the size of a half resource block in order to indicate the location of the synchronization/broadcasting channel from the central frequency. Accordingly, as shown in Table 2, through the use of the shift bit, not only the case where the central location is separated by an integer multiple of the size of the resource block but also the case where the central location is further separated by a half RB size in addition to the integer multiple of the size of the resource block can be expressed.

TABLE 3 dl-PBCHoffset ENUMERATED {0, 180, 360, 540,......,1800}kHz
: Expressed by the absolute bandwidth Referring to Table 3, the location of the broadcasting channel is expressed by the size of the absolute bandwidth. The size of the absolute bandwidth may be used even when the offset is not an integer multiple of the resource block. In the example of Table 3, 0 denotes the case where t offset, that is, the center of the synchronization/broadcasting channel is the center of the system bandwidth.

TABLE 4 dl-PBCHoffset ENUMERATED {n0, n1,n2,n3,.....n10}
: Expressed in the unit of registers of the synchronization signal Referring to Table 4, the location of the broadcasting channel is expressed using the number of registers. The registers denote intervals of frequencies on which synchronization signals may be arranged. For example, when the register of the synchronization signal is 300 kHz, n1 refers to an offset of 300 kHz and n2 refers to an offset of 600 kHz. In Table 4, n0 denotes the case where there is no offset, that is, the center of the synchronization/broadcasting channel is the center of the system bandwidth. According to the example of Table 4, there are 11 candidates from n0 to n10. However, according to another embodiment, there may be 10 or fewer candidates or 12 or more candidates. Further, according to still another embodiment, n0 may be excluded.

The system may adopt one of various embodiments for the definition of information regarding the central frequency, as shown in Table 1, Table 2, Table 3, and Table 4. Alternatively, the system may adaptively operate two or more of the embodiments shown in Table 1, Table 2, Table 3, and Table 4. For example, when the register of the synchronization signal is equal to or smaller than the size of the resource block of the basic subcarrier interval, the offset information shown in Table 1 or Table 2 may be used. When the register of the synchronization signal is larger than the size of the resource block of the basic subcarrier interval, the offset information shown in Table 4 may be used.

The examples of Table 1, Table 2, Table 3, and Table 4 express offsets of broadcasting channels in order to indicate central frequencies. However, according to another embodiment, the offset for the central frequency may be expressed based on the synchronization channel, rather than the broadcasting channel. In this case, similar to Table 1, Table 2, Table 3, and Table 4, the offset of the synchronization channel may be expressed using at least one number of resource blocks, an absolute frequency value, and the number of registers.

According to the embodiment described with reference to FIG. 6D, the BS may provide the terminal with information regarding the system bandwidth through the broadcasting channel. Since each group stay have different sizes of resource blocks, information regarding the system bandwidth transmitted through the broadcasting channel may be defined as Table 5 or Table 6 below.

TABLE 5 dl-Bandwidth ENUMERATED {n25, n50, n100, n200, n400, n800}
: Expressed by the number umber of resource blocks of the basic subcarrier
interval of the corresponding group

TABLE 6 dl-Bandwidth ENUMERATED {5, 10, 20, 40, 80, 160} MHz
: Expressed by the absolute bandwidth of the system bandwidth In the case where information regarding the system bandwidth defined as Table 5 is adopted, if the basic subcarrier interval is 15 kHz and the system bandwidth corresponds to 25 resource block, the size of the system bandwidth corresponds to 12.5 resource blocks in terms of 30 kHz.

When the information regarding the system bandwidth is defined as shown in [Table 5], the system bandwidth of 40 MHz may be expressed as Table 7 below. When the information regarding the system bandwidth is defined as Table 6, the system bandwidth of 40 MHz may be expressed as Table 8 below. Table 7 and Table 8 show the case where the size of the resource block is 12 SubCarriers (SCs) and the case where the size of the resource block is 180 kHz regardless of the subcarrier interval. That is, in the former case, the size of the resource block is 180 kHz when the subcarrier interval is 15 kHz, and the size of the resource block is 45 kHz when the subcarrier inter a 3.75 kHz. In the latter case, the size of the resource block is 180 kHz regardless of the subcarrier interval.

TABLE 7

| | System bandwidth | | |
|---|---|---|---|
| | SC = 15 kHz | SC = 3.75 kHz | |
| dl-Bandwidth Bits | RB = 180 kHz | RB = 180 kHz | RB = 45 kHz |
| 000 | 5 MHz | 5 MHz | 1.25 MHz |
| 001 | 10 MHz | 10 MHz | 2.5 MHz |
| 010 | 20 MHz | 20 MHz | 5 MHz |
| 011 | 40 MHz | 40 MHz | 10 MHz |
| 100 | 80 MHz | 80 MHz | 20 MHz |
| 101 | 160 MHz | 160 MHz | 40 MHz |

TABLE 8

| | System bandwidth | | |
|---|---|---|---|
| | | SC = 3.75 kHz | |
| dl-Bandwidth Bits | SC = 15 kHz | RB = 180 kHz | RB = 45 kHz |
| 000 | 5 MHz | 5 MHz | 5 MHz |
| 001 | 10 MHz | 10 MHz | 10 MHz |
| 010 | 20 MHz | 20 MHz | 20 MHz |
| 011 | 40 MHz | 40 MHz | 40 MHz |
| 100 | 80 MHz | 80 MHz | 80 MHz |
| 101 | 160 MHz | 160 MHz | 160 MHz |

In another example, when the information regarding the system bandwidth is defined as shown in Table 5, the system bandwidth of 40 MHz may be expressed as Table 9 below. When the information regarding the system bandwidth is defined as Table 6, the system bandwidth of 40 MHz may be expressed as Table 10 below. Table 9 and Table 10 show the case where the subcarrier interval is 3.84 MHz and the bandwidth of the resource block is 46.08 MHz and the case where the subcarrier interval is 0.96 MHz and the bandwidth of the resource block is 11.52 MHz.

TABLE 9

| | System bandwidth | |
|---|---|---|
| | SC = 3.84 MHz | SC = 0.96 MHz |
| dl-Bandwidth Bits | RB = 46.08 MHz | RB = 11.52 MHz |
| 000 | 1.28 GHz | 0.32 MHz |
| 001 | 2.56 GHz | 0.64 MHz |
| 010 | 5.12 GHz | 1.28 GHz |
| 011 | 10.24 GHz | 2.56 GHz |
| 100 | 20.48 GHz | 5.12 GHz |
| 101 | 40.96 GHz | 10.24 GHz |

TABLE 10

| | System bandwidth | |
|---|---|---|
| | SC = 3.84 MHz | SC = 0.96 MHz |
| dl-Bandwidth Bits | RB = 46.08 MHz | RB = 11.52 MHz |
| 000 | 1.28 GHz | 1.28 GHz |
| 001 | 2.56 GHz | 2.56 GHz |
| 010 | 5.12 GHz | 5.12 GHz |

TABLE 10-continued

| | System bandwidth | |
|---|---|---|
| dl-Bandwidth Bits | SC = 3.84 MHz<br>RB = 46.08 MHz | SC = 0.96 MHz<br>RB = 11.52 MHz |
| 011 | 10.24 GHz | 10.24 GHz |
| 100 | 20.48 GHz | 20.48 GHz |
| 101 | 40.96 GHz | 40.96 GHz |

Figure 7A:
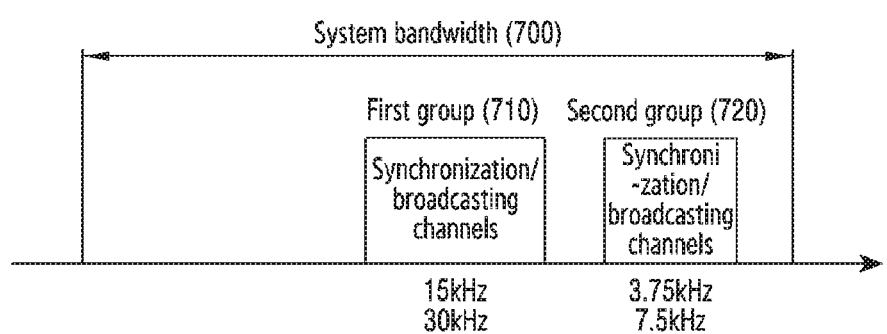
FIG. 7A illustrates another example for allocation of synchronization/broadcasting channels divided on the frequency axis of the groups that share a system bandwidth in the wireless communication system according to various embodiments of the present disclosure.

FIG. 7A illustrates another example for distribution of synchronization/broadcasting channels divided on the frequency axis of the groups that share a system bandwidth in the wireless communication system according to various embodiments of the present disclosure.

Referring to FIG. 7A, two groups 710 and 720 operate within one system bandwidth 700. The first group 710 supports subcarrier intervals of 15 kHz and 30 kHz, and has 15 kHz as a basic subcarrier interval between them. The second group 720 supports subcarrier intervals of 3.75 kHz and 7.5 kHz, and has 3.75 kHz as a basic subcarrier interval between them. At this time, the size of the synchronization/broadcasting channels of the first group 710 may be the same as or different from the size of the synchronization/broadcasting channels of the second group 720. The synchronization/broadcasting channels of the first group 710 are arranged on the central frequency of the system bandwidth 700, and the synchronization/broadcasting channels of the second group 720 are arranged outside the central frequency.

Figure 7B:
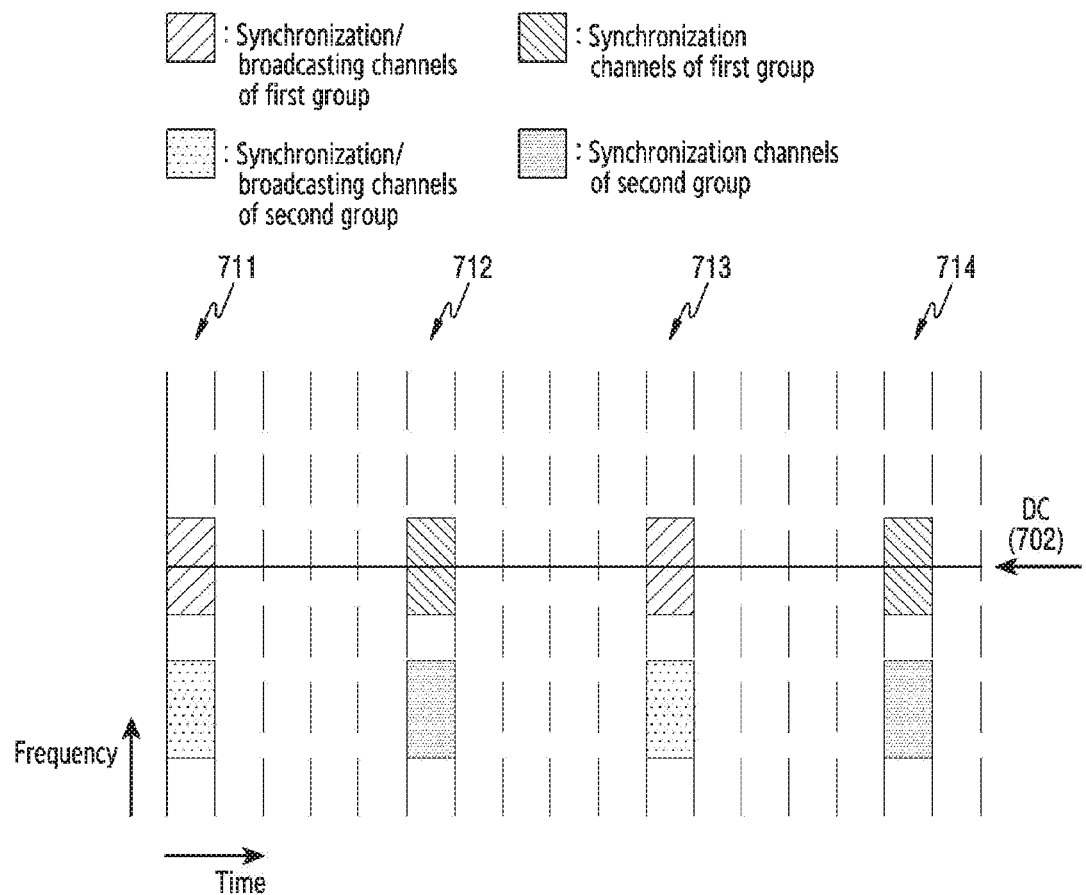
FIG. 7B illustrates yet another example for allocation of synchronization/broadcasting channels divided on the frequency axis of the groups that share the system bandwidth in the wireless communication system according to various embodiments of the present disclosure.

FIG. 7B illustrates another example for allocation of synchronization/broadcasting channels divided on the frequency axis of the groups that share the system bandwidth in the wireless communication system according to various embodiments of the present disclosure.

Referring to FIG. 7B, synchronization channels and broadcasting channels of two groups are periodically allocated. In section 711, the center of the synchronization/broadcasting channels of the first group is the same as the DC subcarrier 702, and the synchronization/broadcasting channels of the second group are arranged on a lower frequency. After the four sections, in section 712, the synchronization channel of the first group and the synchronization channel of the second group are allocated. Thereafter, the synchronization/broadcasting channels of the first group and the second group are allocated in section 713, and the synchronization channels of the first group and the second group are allocated in section 714. That is, the synchronization channel and the broadcasting channel of each group may be periodically allocated, and a period of the synchronization channel may be shorter than a period of the broadcasting channel.

In FIG. 7B, each of sections 711 to 714 may be a subframe. In this case, each of the sections 711 to 714 includes a plurality of symbols. At this time, the synchronization or the broadcasting signals may be repeatedly transmitted through the plurality of symbols, and the synchronization signals or the broadcasting signals transmitted through the plurality of symbols may be transmission-beamformed using different transmission beams. That is, in each of sections 711 to 714, the synchronization signals or the broadcasting signals may be swept.

As described with reference to FIGS. 7A and 7B, the synchronization/broadcasting channels of one of the plurality of groups may be arranged on the central frequency of the system bandwidth. In this case, the information regarding the system bandwidth and the central frequency may be transmitted through broadcasting channels, as described with reference to FIG. 6D and Table 1 to Table 10. However, since the central frequency and the center of the synchronization/broadcasting channels of the first group 710 arranged on the central frequency are the same as each other, an offset is 0. Accordingly, information regarding the central frequency is set as a value indicating the offset of 0. However, according to another embodiment, in order to indicate the offset of 0, the information regarding the central frequency may be excluded from the broadcasting signal. In this case, for correct analysis of the broadcasting signal, an indicator for indicating the presence or absence of the information regarding the central frequency may be further included.

Figure 8A:
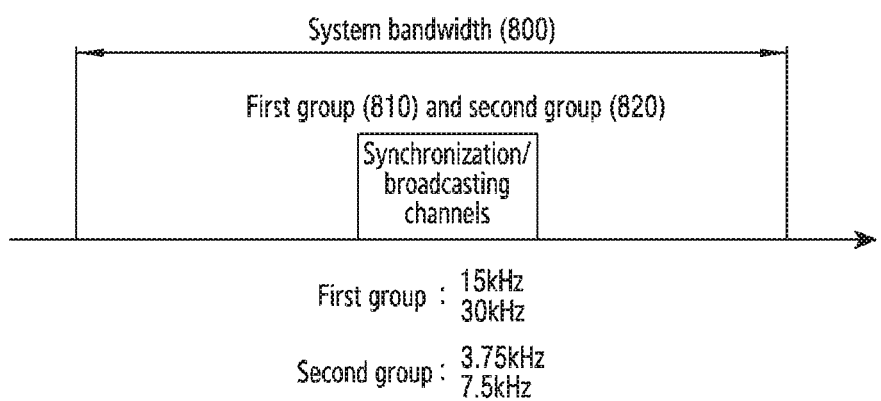
FIG. 8A illustrates an example of distribution of synchronization/broadcasting channels divided on a time axis of the groups that share the system bandwidth in the wireless communication system according to various embodiments of the present disclosure.

FIG. 8A illustrates an example for distribution of synchronization/broadcasting channels divided on the time axis of groups that share the system bandwidth in the wireless communication system according to various embodiments of the present disclosure.

Referring to FIG. 8A, two groups 810 and 820 operate Thin one system bandwidth 800. The first group 810 supports subcarrier intervals of 15 kHz and 30 kHz, and has 15 kHz as a basic subcarrier interval between them. The second group 820 supports subcarrier intervals of 3.75 kHz and 8.5 kHz, and has 3.75 kHz as a basic subcarrier interval between them. At this time, the size of the synchronization/broadcasting channel of the first group 810 may be the same as or different from the size of the synchronization/broadcasting channel of the second group 820. Further, at least a portion of the synchronization/broadcasting channels of the first group 810 and the synchronization/broadcasting channel of the second group 820 are divided using the same frequency resources on the time axis. The synchronization/broadcasting channel of the first group 810 and the synchronization/broadcasting channel of the second group 820 are arranged on the central frequency of the system bandwidth 800. In other words, the synchronization/broadcasting channel of the first group 810 and the synchronization/broadcasting channel of the second group 820 share central frequency resources of the system bandwidth 800.

Figure 8B:
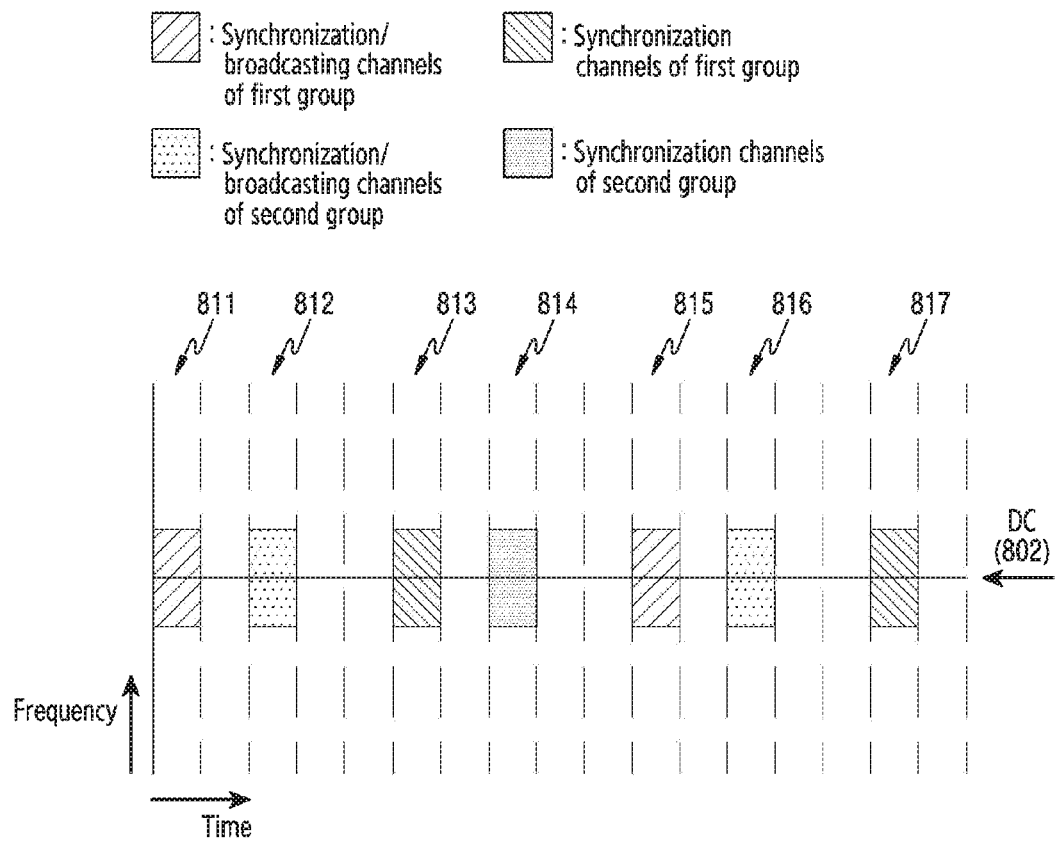
FIGS. 8B and 8C illustrate examples of allocation of synchronization/broadcasting channels divided on the time axis of the groups that share the system bandwidth in the wireless communication system according to various embodiments of the present disclosure.
Figure 8C:
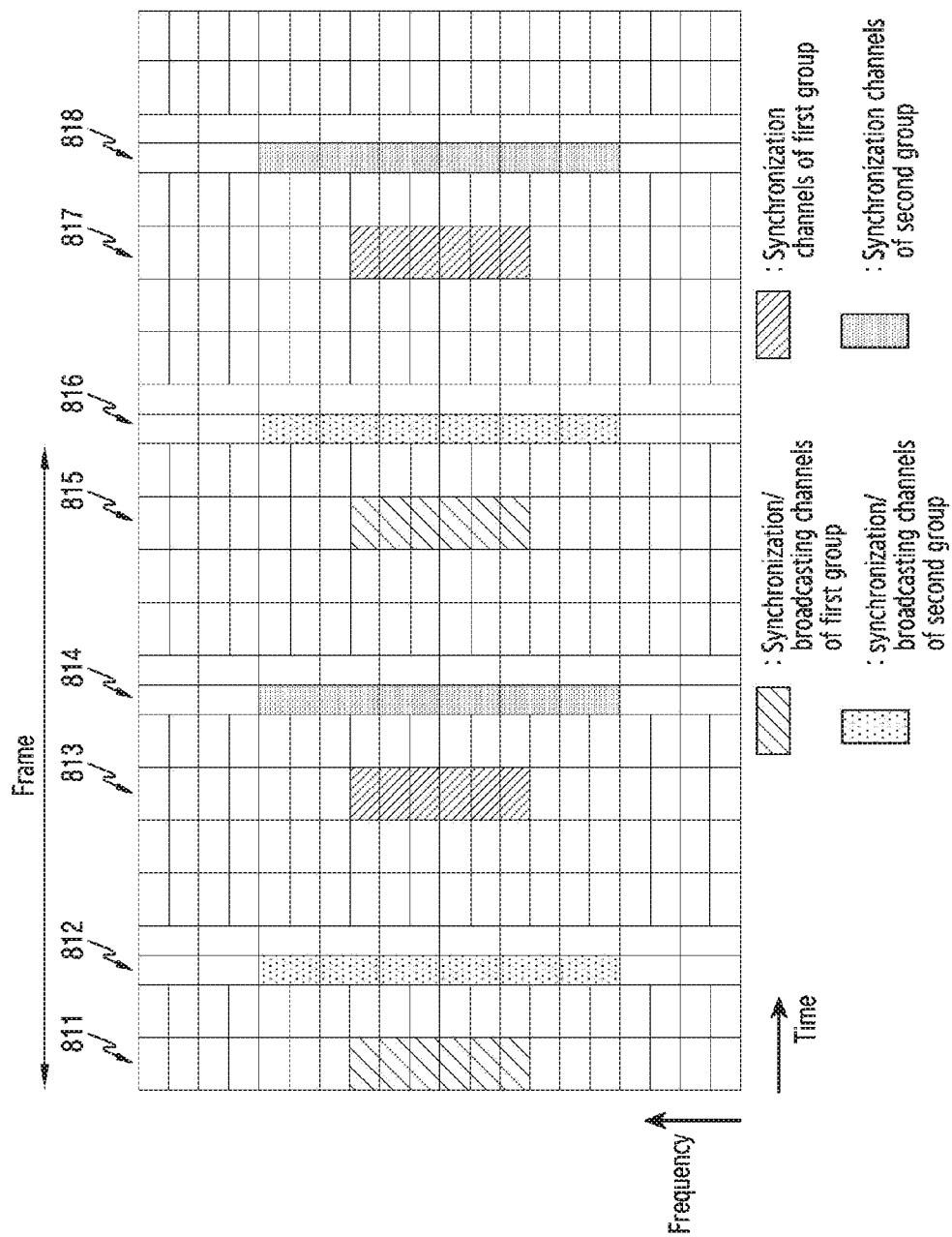

FIGS. 8B and 8C illustrate examples for allocation of synchronization/broadcasting channels divided on the time axis of groups that share the system bandwidth in the wireless communication system according to various embodiments of the present disclosure.

FIG. 8B illustrates the arrangement of synchronization channels and broadcasting channels of two groups. Referring to FIG. 8B, the synchronization channels and the broadcasting channels of the two groups are periodically allocated. The center of the synchronization/broadcasting channels of the first group and the second group is the same as a DC subcarrier 802. The synchronization channel and the broadcasting channel of the first group are allocated in section 811, and the synchronization channel and the broadcasting channel of the second group are allocated in section 812. The synchronization channel of the first group is allocated in section 813, and the synchronization channel of the second group is allocated in section 814. Thereafter, the synchronization channel and the broadcasting channel of the first group, the synchronization channel and the broadcasting channel of the second group, and the synchronization channel of the first group are allocated in sections 815, 816, and 817. The synchronization channel and the broadcasting channel of each group may be periodically allocated, and the period of the synchronization channel may be shorter than the period of the broadcasting channel.

In FIG. 8B, each of sections 811 to 817 may be a subframe. In this case, each of the sections 811 to 814 includes a plurality of symbols. At this time, the synchronization signals or the broadcasting signals may be repeatedly transmitted through the plurality of symbols, and the synchronization signals or the broadcasting signals transmitted through the plurality of symbols may be transmission-beamformed using different transmission beams. That is, in each of sections 811 to 817, the synchronization signals or the broadcasting signals may be swept.

FIG. 8C illustrates more detailed allocation of the synchronization channels and the broadcasting channels of the two groups. Referring to FIG. 8C, the synchronization/broadcasting channels of the first group, the synchronization/broadcasting channels of the second group, the synchronization channel of the first group, and the synchronization channel of the second group are allocated in sections 811, 812, 813, and 814, respectively, and the allocation is repeated in sections 815, 816, 817, and 818. At this time, the frequency bandwidth of the synchronization/broadcasting channels of the second group is two times the frequency bandwidth of the synchronization/broadcasting channels of the first group.

Figure 8D:
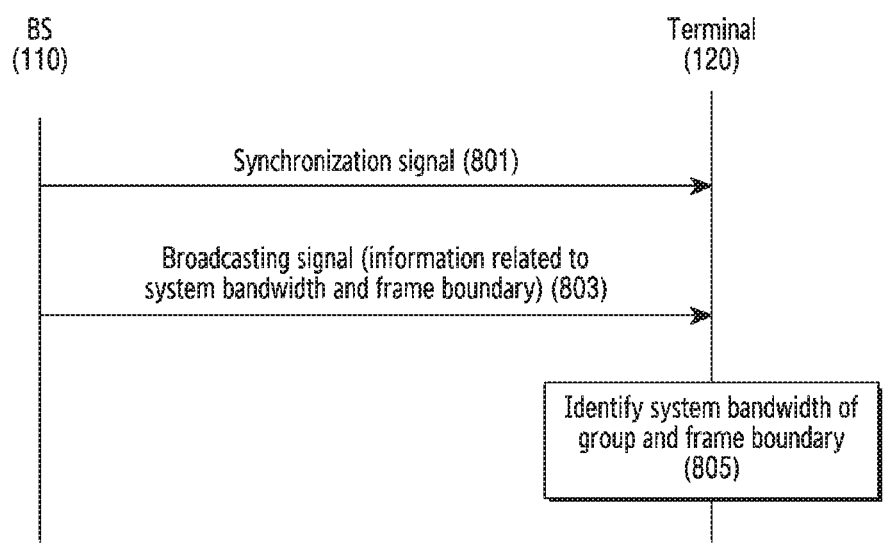
FIG. 8D illustrates signal exchange through broadcasting channels divided on the time axis of groups that share the system bandwidth in the wireless communication system according to various embodiments of the present disclosure.

FIG. 8D illustrates signal exchange through broadcasting channels divided on the time axis of groups that share the system bandwidth in the wireless communication system according to various embodiments of the present disclosure. FIG. 8D shows signaling between the BS 110 and the terminal 120.

Referring to FIG. 8D, in step 801, the BS 110 transmits the synchronization signal of at least one group. Accordingly, the terminal 120 detects the synchronization signal based on the basic configuration of the corresponding group, and acquires synchronization for the BS 110. At this time, the BS 110 may repeatedly transmit the synchronization signal through a plurality of transmission beams. The synchronization signals may be a set of a plurality of synchronization signals, designed to have different purposes and structures.

In step 803, the BS 110 transmits the broadcasting signal. The broadcasting signal is transmitted through the broadcasting channel and includes system information. For example, the broadcasting signal may include a system bandwidth and information regarding a frame boundary. At this time, the BS 110 may repeatedly transmit broadcasting signals through a plurality of transmission beams.

In step 805, the terminal 120 identifies the system bandwidth and the frame boundary. That is, the terminal 120 may identify the system bandwidth and the frame boundary of the corresponding group based on system information included in the broadcasting signal.

When the synchronization/broadcasting channels of the plurality of groups are divided on the time axis, as illustrated in FIGS. 8A to 8D, all of the synchronization/broadcasting channels of the groups may be arranged at the center of the system bandwidth. In this case, offset information of the broadcasting channel for indicating the central frequency may be omitted. However, since the synchronization/broadcasting channels are arranged on different time resources according to each group, relative locations of the synchronization/broadcasting channels within the frame are different according to each group. Accordingly, although the synchronization is acquired using the synchronization signal, the terminal may not determine the frame boundary. Therefore, like the embodiment described with reference to FIG. 8D, the BS may provide the terminal with information regarding the frame boundary through the broadcasting channel.

The information regarding the frame boundary may be transmitted through the broadcasting signal transmitted by the broadcasting channel and may be expressed as a time resource location of the broadcasting channel. More specifically, offset information shown in Table 10 below may be contained in the system information (for example, an MIB) included in the broadcasting signal. The time offset refers to an offset of the broadcasting channel for the frame boundary (for example, a start point and an end point).

TABLE 11

| dl-PBCHtimeoffset | ENUMERATED {n0, n1, ... n10} |
|---|---|
| : Expressed by the number of subframes of the basic subcarrier interval | |

As shown in Table 11, the offset of the broadcasting channel may be expressed by the number of subframes. In the example of Table 11, n0 denotes the case where there is no offset, that is, the synchronization/broadcasting channels are arranged on the frame boundary. According to the example of Table 11, there are 11 candidates from n0 to n10. However, according to another embodiment, there may be 10 or fewer candidates or 12 or more candidates. Further, according to still another embodiment, n0 may be excluded. When n0 is excluded, in order to indicate the value of n0, information regarding the frame boundary may be omitted from the broadcasting signal. In this case, in order to accurately analyze the broadcasting signal, an indicator that indicates the presence or absence of the information regarding the frame boundary may be further included.

Instead of the number of subframes used in Table 11, numbers or indexes of the subframes may be used. According to another embodiment, rather than the offset of the broadcasting channel, an offset for the frame boundary (for example, the start point and the end point) of the synchronization channel may be used. According to still another embodiment, rather than the number of subframes or the numbers of the subframes, an absolute time value may be used.

Figure 9:
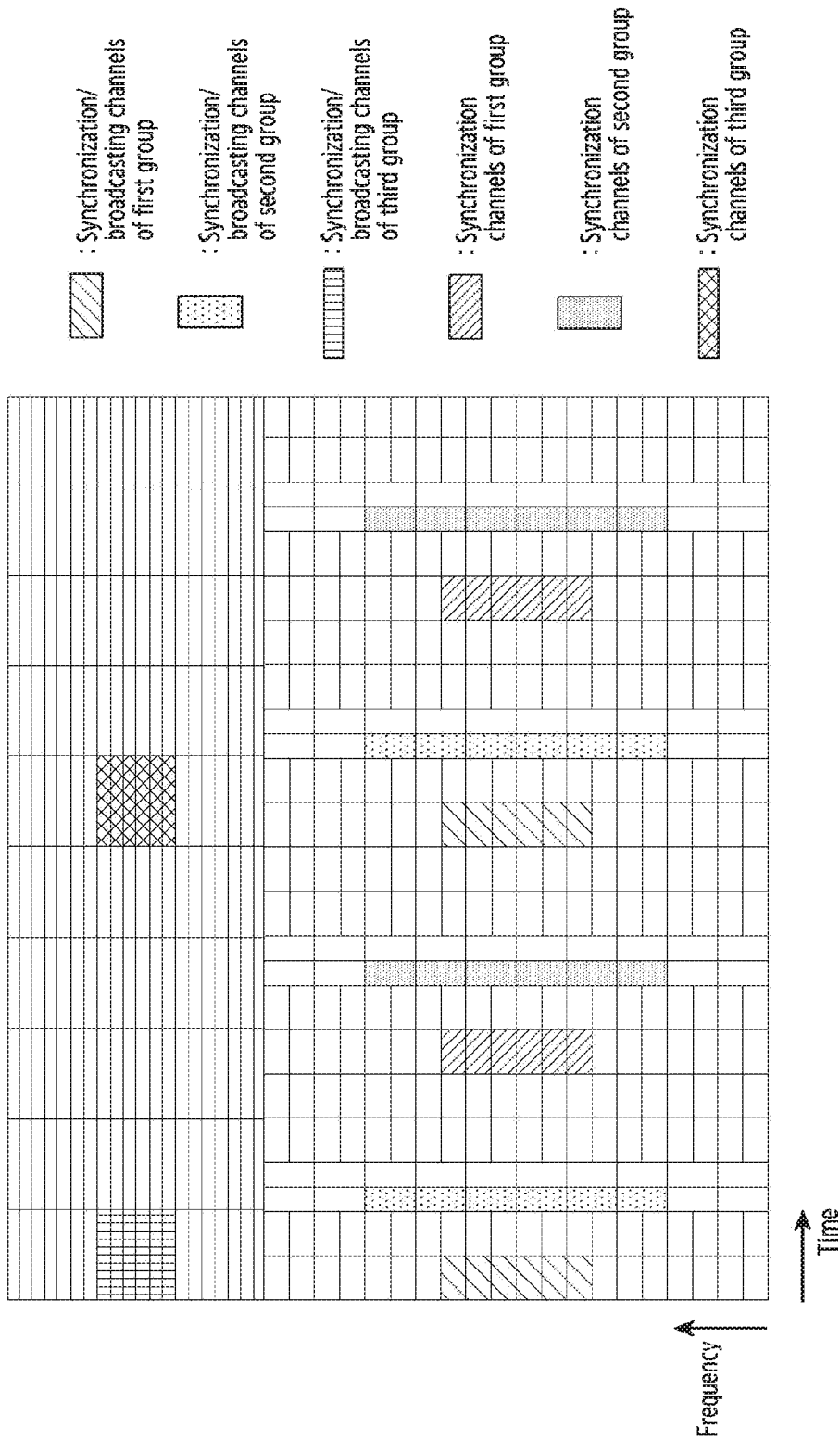
FIG. 9 illustrates an example of allocation of synchronization/broadcasting channels divided on the time axis and the frequency axis of the groups that share the system bandwidth in the wireless communication system according to various embodiments of the present disclosure.

FIG. 9 illustrates an example for allocation of synchronization/broadcasting channels divided on the time axis and the frequency axis of groups that share the system bandwidth in the wireless communication system according to various embodiments of the present disclosure. FIG. 9 shows the allocation of synchronization/broadcasting channels of three groups.

Referring to FIG. 9, synchronization/broadcasting channels of the first group and synchronization/broadcasting channels of the second group are divided on the time axis. The synchronization/broadcasting channels of the first group and the second group are separated from the synchronization/broadcasting channels of the third group. That is, the first group and the second group operate in the same way as that shown in FIG. 7A, and the first group and the third group operate in the same way as that shown in FIG. 6A.

In the allocation of the synchronization/broadcasting channels of FIG. 9, two cases may be considered. The first case corresponds to the case where neither synchronization nor broadcasting channels of the groups are arranged at the center of the system bandwidth. In this case, the broadcasting signal of each group may include offset information of the broadcasting channel, and the broadcasting signal of the second group may further include time offset information. For example, the offset of the broadcasting channel may be defined as shown in one of Table 1 to Table 4, and the time offset may be defined as shown in Table 10. The offset of the broadcasting channel as shown in Table 1 to Table 4 may be referred to as a "frequency offset" to be contrasted with the time offset.

The above-described various embodiments are relevant to sharing of the system bandwidth by a plurality of groups. Hereinafter, the present disclosure describes the case where at least two of the plurality of groups do not share the system bandwidth.

Figure 10A:
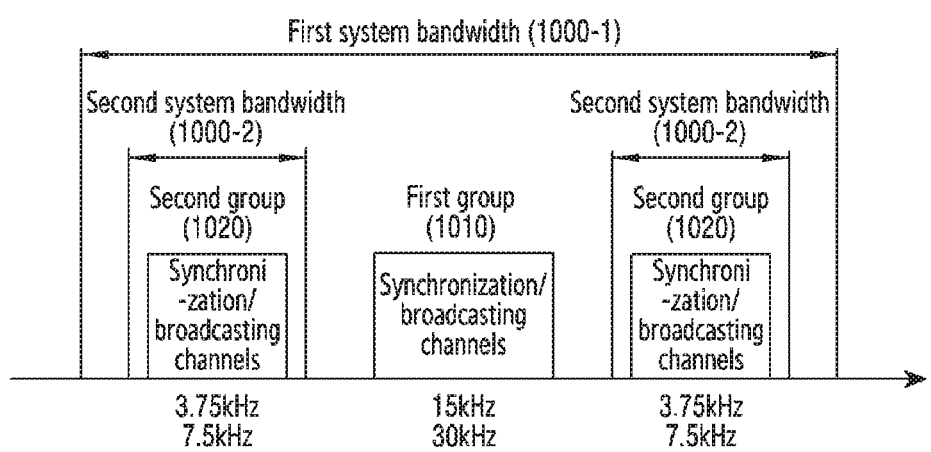
FIG. 10A illustrates an example of distribution of synchronization/broadcasting channels of groups that do not share the system bandwidth in the wireless communication system according to various embodiments of the present disclosure.

FIG. 10A illustrates an example for distribution of synchronization/broadcasting channels of groups that do not share the system bandwidth in the wireless communication system according to various embodiments of the present disclosure.

Referring to FIG. 10A, two groups 1010 and 1020 operate in two system bandwidths 1000-1 and 1000-2. The first group 1010 supports subcarrier intervals of 15 kHz and 30 kHz, and has 15 kHz as a basic subcarrier interval between them. The second group 1020 supports subcarrier intervals of 3.75 kHz and 7.5 kHz, and has 3.75 kHz as a basic subcarrier interval between them. At this time, the size of synchronization/broadcasting channels of the first group 1010 may be the same as or different from the size of synchronization/broadcasting channels of the second group 1020.

The first group 1010 operates in the first system bandwidth 1000-1, and the second group 1020 operates in the second system bandwidth 1000-2. As illustrated in FIG. 10A, the first system bandwidth 1000-1 includes the second system bandwidth 1000-2. That is, the second system bandwidth 1000-2 may be narrower than the first system bandwidth 1000-1, and the second system bandwidth 1000-2 of the second group 1020 may be included in the first system bandwidth 1000-1 of the first group 1010. Accordingly, the second group 1020 may be used for a service (for example, a narrow band (NB) internet of thing (IoT)) that requires a relatively narrow bandwidth. The second bandwidth 1000-2 of the group 1020 may include two separated bands. Synchronization/broadcasting channels of the first group 1010 and the second group 1020 may be arranged at centers of the system bandwidths, respectively.

Figure 10B:
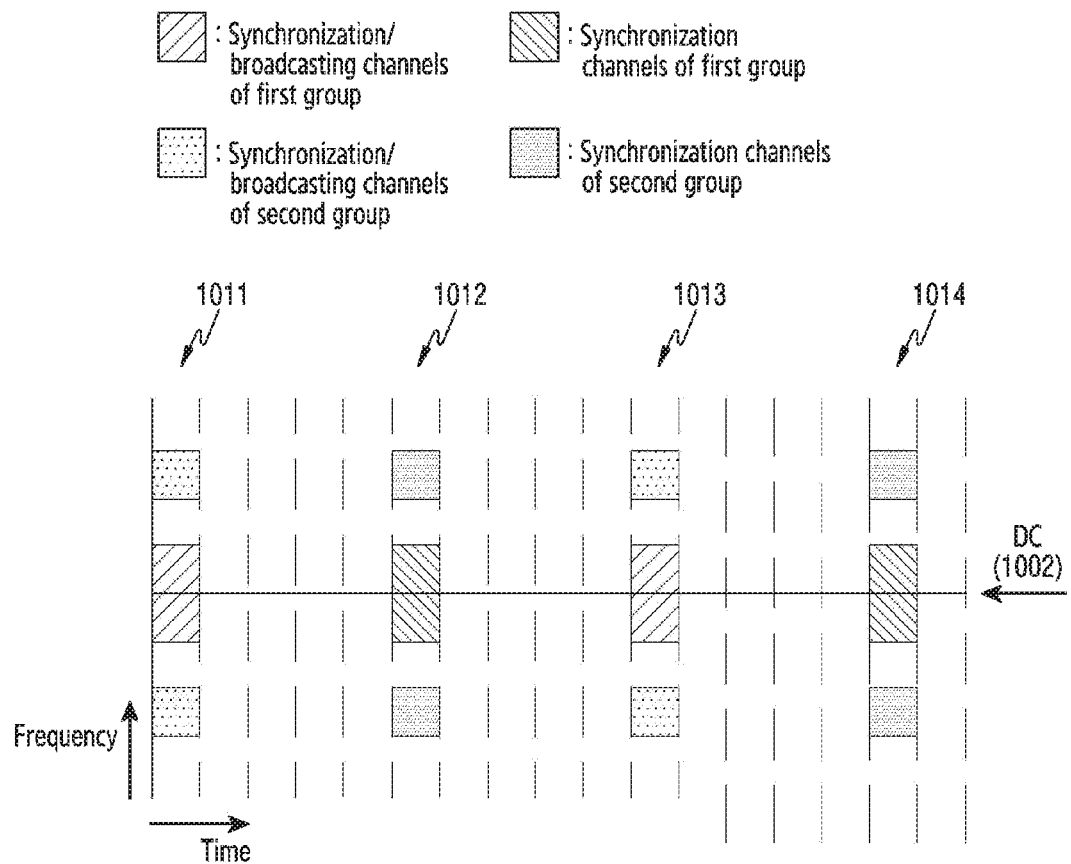
FIG. 10B illustrates an example of allocation of synchronization/broadcasting channels of the groups that do not share the system bandwidth in the wireless communication system according to various embodiments of the present disclosure.

FIG. 10B illustrates an example for allocation of synchronization/broadcasting channels of groups that do not share the system bandwidth in the wireless communication system according to various embodiments of the present disclosure.

Referring to FIG. 10B, synchronization channels and broadcasting channels of two groups are periodically allocated. In section 1011, the center of the synchronization/broadcasting channels of the first group is the same as the DC subcarrier 1002, and the synchronization/broadcasting channels of the second group are arranged in a distributed manner on a louver frequency and a higher frequency. After the four sections, in section 1012, the synchronization channel of the first group and the synchronization channel of the second group are allocated. Thereafter, the synchronization/broadcasting channels of the first group and the second group are allocated in section 1013, and the synchronization channels of the first group and the second group are allocated in section 1014. That is, the synchronization channel and the broadcasting channel of each group may be periodically allocated, and the period of the synchronization channel may be shorter than the period of the broadcasting channel.

In FIG. 10B, each of sections 1011 to 1014 may be a subframe. In this case, each of the sections 1011 to 1014 includes a plurality of symbols. At this time, the synchronization signals or the broadcasting signals may be repeatedly transmitted through the plurality of symbols, and the synchronization signals or the broadcasting signals transmitted through the plurality of symbols may be transmission-beamformed using different transmission beams. That is, in each of sections 1011 to 1014, the synchronization signals or the broadcasting signals may be swept.

When the system bandwidth is not shared, as illustrated in FIGS. 10A and 10B, the synchronization/broadcasting channels of each group are located on the central frequency, so that offset information on the frequency axis may be omitted. Further, since the system bandwidth is independent, the division of synchronization/broadcasting channels on the time axis is not needed, and accordingly, time offset information may be also omitted.

When the first system bandwidth 1000-1 of the first group 1010 includes the second system bandwidth 1000-2 of the second group 1020, as illustrated in FIGS. 10A and 10B, available resources for a service of the first group 1010 may or may not include resources within the second system bandwidth 1000-2. In other words, available resources of the first group 1010 and available resources of the second group 1020 may overlap each other, or may be exclusively used.

Resource operation depending on whether or not the available resources overlap each other may be managed by scheduling of the BS. However, among uplink signals transmitted by the terminal, signals transmitted through the entire bandwidth may have a possibility of collision. For example, a sounding reference signal may be transmitted over the whole band. Hereinafter, the sounding reference signal is described as an example of the uplink signal, but the following procedure may be applied to transmission of another uplink signal characterized in that the other uplink signal is transmitted over the whole band, without allocation of particular frequency resources.

The sounding reference signal is used for an uplink channel by the BS. Accordingly, when the sounding reference signal collides, channel estimation performance may deteriorate. Therefore, the BS informs the terminal belonging to the first group 1010 of the frequency resource location of the system bandwidth of the second group 1020, and transmits the sounding reference signal in the remaining frequency resources except for the frequency resources of the second system bandwidth 1000-2 of the second group 1020. As a result, collision of the sounding reference signal may be prevented. Hereinafter, embodiments for informing the terminal of frequency resources used as the system bandwidth of another group will be described.

Figure 10C:
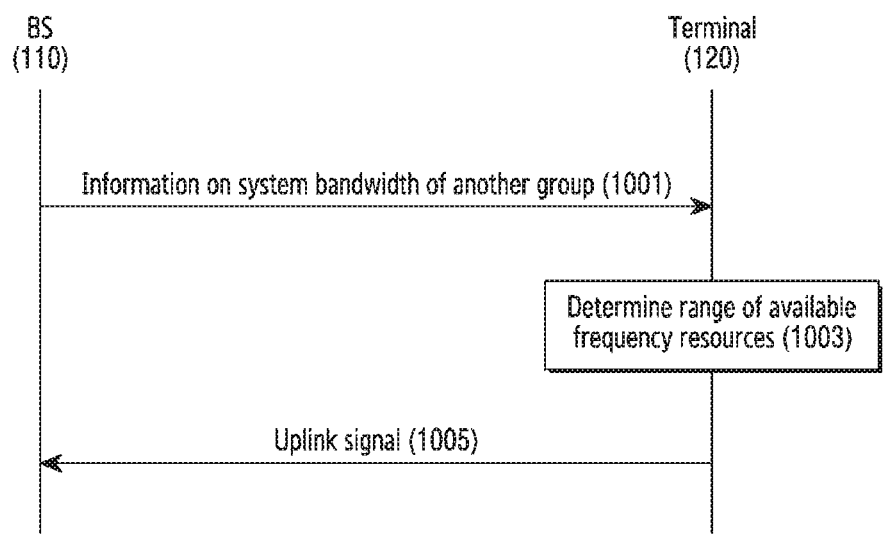
FIG. 10C illustrates signal exchange related to groups that do not share the system bandwidth in the wireless communication system according to various embodiment of the present disclosure.

FIG. 10C illustrates signal exchange related to the groups that do not share the system bandwidth in the wireless communication system according to various embodiment of the present disclosure. FIG. 10C shows signaling of the BS 110 and the terminal 120.

Referring to FIG. 10C, in step 1001, the BS 110 transmits information on the system bandwidth of another group. The information on the system bandwidth of the other group indicates frequency resources occupied by the system bandwidth of at least one other group. More specifically, the information on the system bandwidth of the other group includes at least one of information (for example, a bitmap) indicating a resource group including resources belonging to the system bandwidth of the other group, information (for example, a shift bit) indicating the location of resources in the resource group, or information (for example, a size bit) indicating the size of resources. For example, the information on the system bandwidth of the other group may be transmitted as broadcasting information or control information for the uplink signal.

In step 1003, the terminal 120 determines the range of available frequency resources. More specifically, the terminal identifies frequency resources within the system bandwidth of at least one other group based on the information received in step 1001 and determines the remaining resources as available frequency resources. At this time, the limitation of available frequency resources may be temporary, or limy be valid only for a particular signal. For example, the limitation of the available frequency resources may be valid for a reference signal and may not be valid for a data signal. That is, the limitation of the available frequency resources may be partially applied to aspects of time and signal type.

In step 1005, the terminal transmits the uplink signal. That is, the terminal maps the signal to resources within the range of the available frequency resources and transmits the signal. For example, the uplink signal may be the sounding reference signal. At this time, the terminal may beamform the uplink signal using at least one transmission beam.

As illustrated with reference to FIG. 10C, the BS provides the terminal with the information on the system bandwidth of the other group. The information on the system bandwidth of the other group may be included in broadcasting information or control information for the uplink signal. Hereinafter, each embodiment will be described.

The information on the system bandwidth of the other group may be transmitted as broadcasting information (for example, an MIB or SIB). In this case, the information on the system bandwidth of the other group may be transmitted at a period that is shorter than or the same as a period at which the arrangement of signals is changed within the system bandwidth of the other group. According to an embodiment, the information on the system bandwidth of the other group (for example, the second group 1020) may be transmitted along with information regarding the system bandwidth of the corresponding group (for example, the first group 1010), as shown in Table 5 or Table 6. According to another embodiment, the information on the system bandwidth of the other group may be transmitted separately from the information regarding the system bandwidth of the corresponding group (for example, the first group 1010) as shown in Table 5 or Table 6. For example, the information on the system bandwidth of the other group may be transmitted through the SIB, and the information regarding the system bandwidth of the corresponding group may be transmitted through the MIB.

Alternatively, the information on the system bandwidth of the other group may be transmitted as configuration information for the sounding reference signal. For transmission of the sounding reference signal, the terminal may be configured by the BS. At this time, the terminal receives control information regarding the transmission of the sounding reference signal, and the control information includes information on transmission timing of the sounding reference signal. The control information, that is, the configuration information, may include information on the system bandwidth of another group, that is, frequency allocation information for the transmission of the sounding reference signal. When the configuration information indicates resources of the system bandwidth of the other group, the configuration information may be analyzed in order to avoid the corresponding resources. In contrast, when the configuration information indicates resources other than the system bandwidth of the other group, the configuration information may be analyzed to allocate the corresponding resources for the transmission of the sounding reference signal.

However, not all groups may provide information on system bandwidths of other groups. For example, in the case of FIG. 10A, system information of the first group 1010 may include information on the second system bandwidth 1000-2 of the second group 1020, but system information of the second group 1020 may not include information on the first system bandwidth 1000-1 of the first group 1010.

As described above, the information the system bandwidths of the other groups may be provided to the terminal through the system information or the control information for the uplink signal. The information on the system bandwidth of the other group may be expressed in various forms. For example, the information on the system bandwidth of the other group may be defined as illustrated in FIGS. 10D and 10E.

Figure 10D:
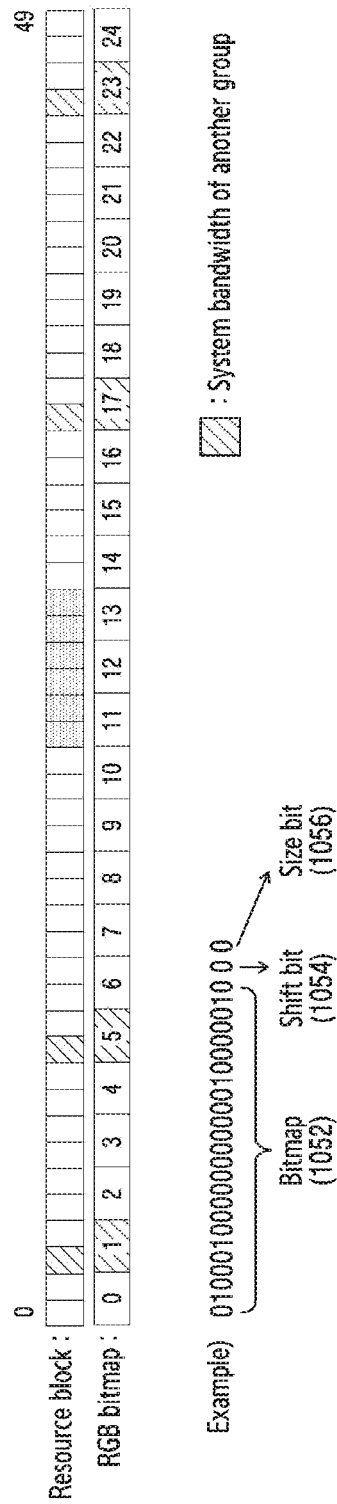
FIGS. 10D and 10E illustrate examples of information on the system bandwidth of another group in groups that do not share the system bandwidth in the wireless communication system according to various embodiments of the present disclosure.
Figure 10E:
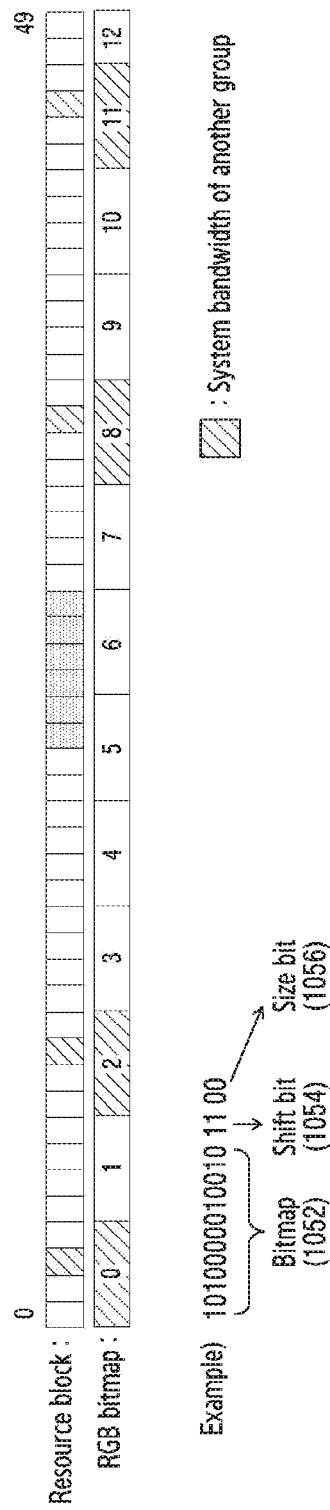

FIGS. 10D and 10E illustrate examples of information on the system bandwidth of the other group in groups that do not share the system bandwidth in the wireless communication system according to various embodiments of the present disclosure. FIGS. 10D and 10E show cases where the system bandwidth of the other group is distributed as four bands. For convenience of the description, "information on the system bandwidth of the other group" is referred to as "resource limit information."

Referring to FIGS. 10D and 10E, the resource limit informations expressed in the form of a bitmap 1052, and includes a shift bit 1054 and a size bit 1056 as well as the bitmap 1052. The bitmap 1052 indicates at least one resource block group having resource blocks belonging to the system bandwidth of the other group among resource block groups (RBGs). The shift bit 1054 indicates the start location of at least one resource block belonging the system bandwidth of the other group within the resource block group. More specifically, the shift bit 1054 indicates which resource block, among the resource blocks within the resource block group indicated by the bitmap 1052, belongs to the system bandwidth of the other group. The size bit 1056 indicates the length of at least one resource block belonging to the system bandwidth of the other group. More specifically, the size bit 1056 indicates how many resource blocks from the resource block indicated by the bitmap 1052 and the shift bit 1054 belong to the system bandwidth of the other group.

FIG. 10D illustrates the case where the system bandwidth of the other group is included within the system bandwidth of the group having a system bandwidth of 50 resource blocks, wherein the system bandwidth of the other group includes four bands having the size of one resource block, and the size of the resource block group corresponds to two resource blocks. Referring to FIG. 10D, the system bandwidth of the other group includes resource block 2, resource block 10, resource block 34, and resource block 46. Accordingly, resource block group 1, resource block group 5, resource block group 17, and resource block group 23 are indicated by the bitmap 1052. Since resource block 2 corresponds to a first resource block among the resource blocks belonging to resource block group 1, the shift bit 1054 is set as a value (for example, 0) indicating the first resource block. Since it is noted that one resource block belongs to the system bandwidth of the other group from resource block 2, the size bit 1056 is set as a value (for example, 0) indicating one resource block. At this time, 25 bits are required for the bitmap 1052 for the resource block groups, 1 bit is required for the shift bit 1054, 1 bit is required for the size bit 1056, and the total overhead of the resource limit information corresponds to 27 bits.

FIG. 10E illustrates the case where the system bandwidth of the other group is included within the system bandwidth of the group having the system bandwidth of 50 resource blocks, wherein the system bandwidth of the other group includes four bands having the size of one resource block and the size of the resource block group corresponds to four resource blocks. Referring to FIG. 10E, the system bandwidth of the other group includes resource block 2, resource block 10, resource block 34, and resource block 46. Accordingly, resource block group 0, resource block group 2, resource block group 8, and resource block group 11 are indicated by the bitmap 1052. Since resource block 2 corresponds to a third resource block among the resource blocks belonging to resource block group 1, the shift bit 1054 is set as a value (for example, 10) indicating the third resource block. Since it is noted that one resource block belongs to the system bandwidth of the other group from resource block 2, the size bit 1056 is set as a value (for example, 00) indicating one resource block. At this time, 13 bits are required for the bitmap 1052 for 13 resource block groups, 2 bits are required for the shift bit 1054, and 2 bits are required for the size bit 1056, and the total overhead of the resource limit information corresponds to 17 bits.

In the example of FIG. 10E, the size of the resource block group corresponds to four resource blocks, which is larger than that in the example of FIG. 10D. The size of the bitmap 1052 is determined according to the size of the resource block group, and as the size of the resource block group increases, the size of the bitmap 1052 becomes smaller. However, as the size of the resource block group increases, the number of candidates of resource blocks belonging to the system bandwidth of the other group which may exist within the resource block group also increases, so that the size of the shift bit 1054 and the size bit 1056 increases. Accordingly, it is required to select a value suitable for the size of the resource block group in consideration of the overhead.

In the embodiments described with reference to FIGS. 10D and 10E, each bit of the bitmap 1052 is mapped to the resource block group. However, according to another embodiment, each bit of the bitmap 1052 may be mapped to the resource block rather than to the resource block group. In this case, the shift bit 1054 and the size bit 1056 may not be needed. However, when groups have different sizes of resource blocks, the shift bit 1054 and the size bit 1056 may be used even though each bit of the bitmap 1052 is mapped to the resource block.

According to the resource limit information as shown in FIGS. 10D and 10E, available resources within the group may be limited. Accordingly, the BS and the terminal may effectively index resource blocks based on location information of the system bandwidth of the other group identified by the resource limit information. For example, resource blocks may be indexed as illustrated in FIG. 10F.

Figure 10F:
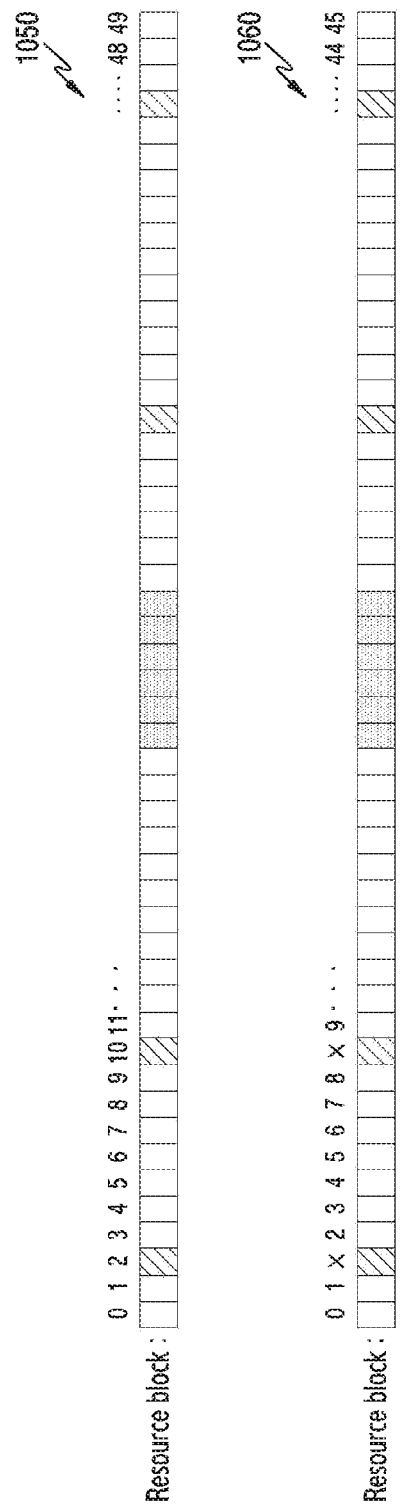
FIG. 10F illustrates an example of resource indexing in consideration of the system band of the other group in groups that do not share the system bandwidth in the wireless communication system according to various embodiments of the present disclosure.

FIG. 10F illustrates an example of resource indexing in consideration of the system band of the other group in groups that do not share the system bandwidth in the wireless communication system according to various embodiments of the present disclosure.

Referring to FIG. 10F, all resource blocks are sequentially indexed based on an indexing rule 1050, regardless of resource limits. In this case, resource blocks belonging to the system bandwidth of the other group are regulated so as not to be used. Accordingly, in resource allocation, the BS uses only the remaining indexes, except for indexes of the resource blocks belonging to the system bandwidth of the other group.

Based on an indexing rule 1060, except for resource blocks belonging to the system bandwidth of the other group, the remaining resource blocks are sequentially indexed. In this case, resource allocation may be performed without consideration of the indexes of regulated resource blocks. If the resources within the system bandwidth of the other group are allocated, the resources are not indicated by normal indexes, so the terminal would ignore resource allocation information. That is, since the resource blocks belonging to the system bandwidth of the other group cannot be indicated, the BS and the terminal follow the resource limit.

Figure 11:
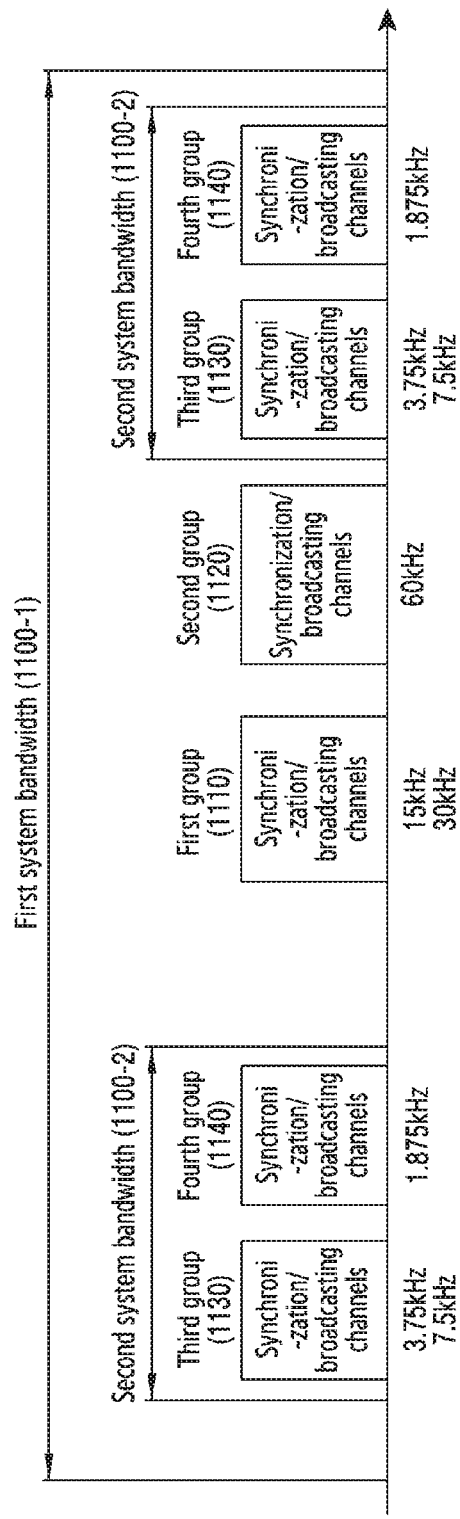
FIG. 11 illustrates an example for distribution of synchronization/broadcasting channels in an environment where groups that share the system bandwidth and groups that do not share the system bandwidth coexist in the wireless communication system according to various embodiments of the present disclosure.

FIG. 11 illustrates an example for distribution of synchronization/broadcasting channels in an environment where groups that share the system bandwidth and groups that do not share the system bandwidth coexist in the wireless communication system according to various embodiments of the present disclosure.

Referring to FIG. 11, four groups 1110, 1120, 1130, and 1140 operate in two system bandwidths 1100-1 and 1100-2. The first group 1110 supports subcarrier intervals of 15 kHz and 30 kHz, and has 15 kHz as a basic subcarrier interval between them. The second group 1120 supports a subcarrier interval of 60 kHz, and has 60 kHz as a basic subcarrier interval. The third group 1130 supports subcarrier intervals of 3.75 kHz and 7.5 kHz, and has 175 kHz as a basic subcarrier interval between them. The fourth group 1140 supports a subcarrier interval of 1.875 kHz, and has 1.875 kHz as a basic subcarrier interval.

The first group 1110 and the second group 1120 share the first system bandwidth 1110-1, and synchronization/broadcasting channels of the first group 1110 and the second group 1120 are divided on the frequency axis. Accordingly, the first group 1110 and the second group 1120 operate as described in FIG. 6A. Similarly, the third group 1130 and the fourth group 1140 share the second system bandwidth 1110-2, and synchronization/broadcasting channels of the third group 1130 and the fourth group 1140 are divided on the frequency axis. Accordingly, the third group 1130 and the fourth group 1140 operate as described in FIG. 6A.

The first group 1110 and the third group 1130 do not share the system bandwidth, and the first system bandwidth 1110-1 of the first group 1110 includes the second system bandwidth 1110-2 of the third group 1130. Accordingly, the first group 1110 and the third group 1130 operate as described in FIG. 10A. Similarly, in the relationship between the first group 1110 and the fourth group 1140, the relationship between the second group 1120 and the third group 1130, and the relationship between the second group 1120 and the fourth group 1140, each group may operate as described in FIG. 10A.

That is, in the embodiment of FIG. 11, the environment where the system bandwidth is shared and the environment where the system bandwidth is not shared coexist. Accordingly, all of the information regarding the system bandwidth, the information regarding the central frequency, and the information regarding the frame boundary may be used. Further, the resource limit information may be used.

As described above, a plurality of groups that support different numerologies may coexist, and the groups may or may not share the system bandwidth. Alternatively, some groups may share the system bandwidth, and other groups may not share the system bandwidth.

When the system bandwidth is shared by a plurality of groups, resources may be overlappingly or exclusively used by the plurality of groups. When the resources are exclusively used, the resources are distributed by each group on at least one of the time axis and the frequency axis. At this time, in consideration of the situation where the resources on the frequency axis are exclusively used in one time section (for example, subframe or slot), frequency resources allocated for one group may not be used by another group.

Accordingly, resource allocation in consideration of resource allocation or a resource use state of another group is necessary. At this time, various forms of resource allocation information for transmitting the result of the resource allocation may be defined. For example, like type 0 of an LTE system, the form of indexing resource blocks and indicating indexes through a bitmap may be adopted. In this case, indexing for frequency resources, for example, resource blocks, may be also variously performed in consideration of the environment where a plurality of groups coexist.

According to various embodiments, resource block indexing of groups that share system bandwidth may be performed as independent indexing or unified indexing. Independent indexing corresponds to a type indicating resource blocks through different indexes in groups, and unified indexing corresponds to a type indicating resource blocks through the same index in groups.

Hereinafter, independent indexing and unified indexing will be described based on the situation where the system bandwidth is shared. However, this is only for convenience of description, and even in the situation where the system bandwidth is not shared, if some bands of the system bandwidth are shared, the following indexing may be applied within the shared bands.

Figure 12A:
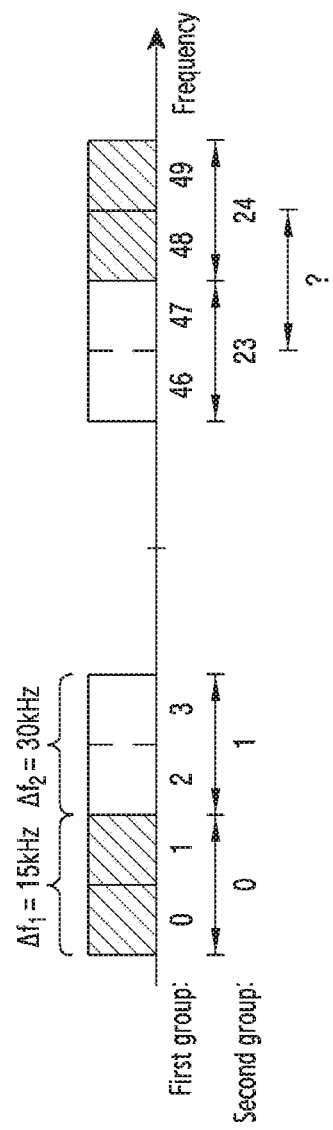
FIG. 12A illustrates independent indexing for resource blocks in the wireless communication system according to various embodiments of the present disclosure.

The independent resource block indexing is as illustrated in FIG. 12A. FIG. 12A illustrates independent indexing for resource blocks in the wireless communication system according to various embodiments of the present disclosure. FIG. 12A shows the case where a subcarrier interval of a first group is 15 kHz and a subcarrier interval of a second group is 30 kHz. In FIG. 12A, the size of a resource block is defined as the number of subcarriers, and accordingly, the size of the resource block for the first group is 180 kHz and the size of the resource block for the second group is 360 kHz.

Referring to FIG. 12A, the number of resource blocks for the first group is 50, the blocks being indexed from 0 to 49. The size of the resource block for the second group is two times the size of the resource block of the first group, and the number of resource blocks of the second group is 25, the blocks being indexed from 0 to 24. Resource block 0 for the second group is defined at the same location as resource blocks 0 and 1 for the first group, and resource block 1 for the second group is defined at the same location as resource blocks 2 and 3 for the first group. However, based on the result of the sequential indexing, there is no resource block for the second group, which is defined in the same frequency resources as resource blocks 47 and 48 for the first group. Accordingly, the present disclosure proposes various embodiments using a shift index to provide flexibility of resource allocation.

In the resource blocks illustrated in FIG. 12A, the size of the resource block of the first group is different from the size of the resource block of the second group. Hereinafter, in the present disclosure, a frequency resource chunk having a predetermined size is referred to as a "frequency unit" for comparison of the resource block size. When the sizes of resource blocks of the groups using the same bandwidth have a multiple relationship therebetween, the size of one frequency unit may be defined to be the same as the size of a minimum resource block. However, when the sizes of the resource blocks of the groups using the same bandwidth do not have a relationship in multiples therebetween, the size of one frequency unit may be defined to be smaller than the size of the minimum resource block. For example, in FIG. 12A, the size of the resource block of the first group is defined as the size of one frequency unit.

Figure 12B:
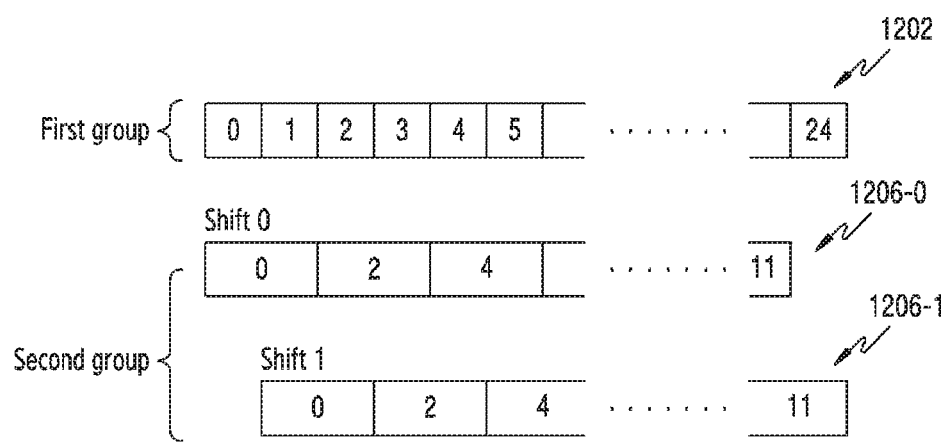
FIG. 12B illustrates independent indexing for resource blocks to which a shift index is applied in the wireless communication system according to various embodiments of the present disclosure.

FIG. 12B illustrates independent indexing for resource blocks to which the shift index is applied in the wireless communication system according to various embodiments of the present disclosure. FIG. 12B shows indexing results of the first group and the second group.

Referring to FIG. 12B, the resource block size of the first group corresponds to one frequency unit, and the resource block size of the second group corresponds to two frequency units. That is, the resource block size of the second group is two times the resource block size of the first group. At this time, based on an indexing rule 1202 of the first group, 25 resource blocks are indexed from 0 to 24. The second group follows two indexing rules 1206-0 and 1206-1 according to a shift value. In the indexing rule 1206-0, 12 resource blocks are indexed from 0 to 11 such that resource block 0 of the second group starts at the same location as resource block 0 of the first group. In the indexing rule 1206-1, 12 resource blocks are indexed from 0 to 11 such that resource block 0 of the second group starts at the same location as resource block 1 of the first group. That is, the resource blocks indicated by the indexing rule 1206-1 are defined on frequency resource shifted by one frequency unit compared to the resource blocks indicated by the indexing rule 1206-0. As described above, by using the two indexing rules 1206-0 and 1206-1, the resource blocks of the second group defined on the same frequency resources as combinations of all the successive two resource blocks among the 25 resource blocks of the first group may be indicated. That is, by expressing resource allocation information as information (for example, a bitmap) indicating indexes of resource blocks and information (for example, a shift index) indicating a start point of the resource block, the resource blocks of the second group corresponding to all combinations of the successive two frequency units may be indicated.

As described with reference to FIG. 12B, more resource block candidates may be secured through the information indicating the start point of the resource block. Hereinafter, the information indicating the start point of the resource block is referred to as a "shift index," a "shift bit," or a "shift value." The shift index indicates one of two or more indexing rules, and thus may be referred to as an "indexing rule indicator" or another term having a technical meaning equivalent thereto. Further, the shift index indicates a difference in start points of resource blocks between groups, and thus may be referred to as an "offset," a "resource block offset," or another term having a technical meaning equivalent thereto.

Figure 12C:
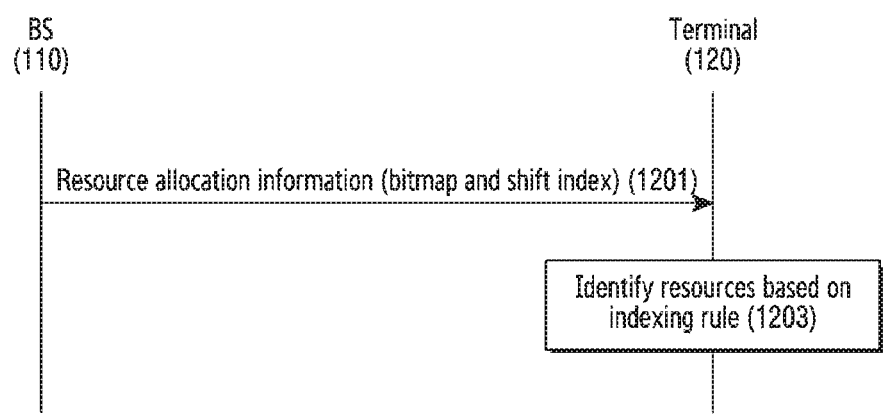
FIG. 12C illustrates signal exchange using independent indexing for resource blocks to which the shift index is applied in the wireless communication system according to various embodiments of the present disclosure.

FIG. 12C illustrates signal exchange using independent indexing for resource blocks to which the shift index is applied in the wireless communication system according to various embodiments of the present disclosure. FIG. 12C shows signaling of the BS 110 and the terminal 120.

Referring to FIG. 12C, in step 1201, the BS 120 transmits resource allocation information. The resource allocation information indicates a resource allocation result for at least one terminal including the terminal 120. For example, the resource allocation information may be transmitted through a downlink control channel. At this time, the resource allocation information includes information (for example, a bitmap) indicating indexes of resource blocks and information (for example, a shift index) indicating a start point of the resource block.

In step 1203, the terminal 120 identifies resources based on an indexing rule. In other words, the terminal 120 analyzes resource allocation information according to an indexing rule of a group to which the terminal 120 belongs, and identifies at least one resource block allocated to the terminal 120. More specifically, the terminal 120 may identify the location at which a first resource block starts through the information indicating the start point of the resource block included in the resource allocation information, and may identify which resource block is allocated through the information indicating the index of the resource block.

Hereinafter, the present disclosure describes detailed examples of resource allocation information generated based on the indexing rules with reference to FIGS. 12D to 12I, FIGS. 12B, and 12C. FIGS. 12D to 12I illustrate examples of the independent indexing for resource blocks to which the shift index is applied in the wireless communication system according to various embodiments of the present disclosure.

Figure 12D:
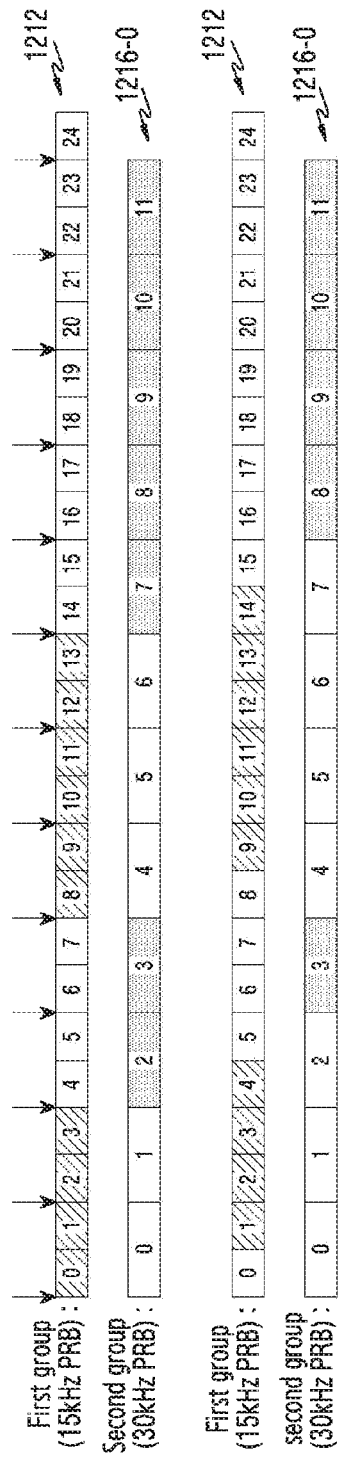
Figure 12E:
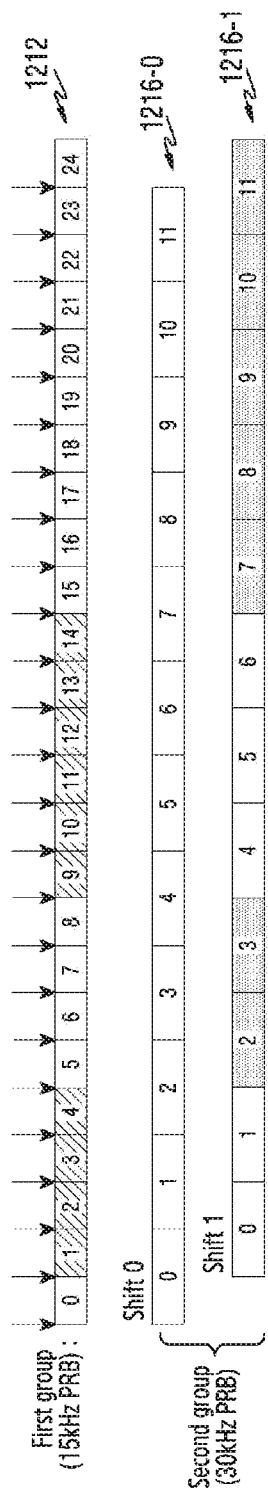
Figure 12F:
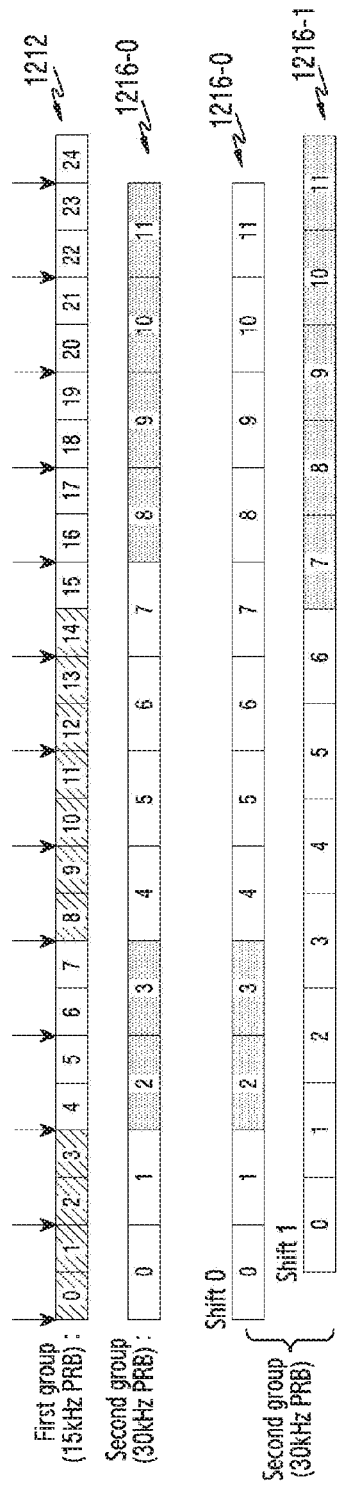

FIGS. 12D to 12F show changes in available resource blocks of the second group according to resource block indexing and a resource allocation result of the first group in the situation where the first group, which supports a subcarrier interval of 15 kHz, and the second group, which supports a subcarrier interval of 30 kHz, use the same band. One resource block of the first group includes one frequency unit, and one resource block of the second group includes two frequency units.

FIG. 12D illustrates the case where the shift index is not used. Referring to FIG. 12D, resource blocks of the first group are indexed from 0 to 24 based on an indexing rule 1212, and resource blocks of the second group are indexed from 0 to 11 based on an indexing rule 1216-0. At this time, the resource blocks of the second group start at locations of resource blocks of even-numbered indexes of the first group. In the example in the upper part of FIG. 12D, resource blocks 0, 1, 2, 3, 8, 9, 10, 11, 12, and 13 are allocated among the resource blocks of the first group. Accordingly, resource blocks 2, 3, 7, 8, 9, 10, and 11 of the second group, which are included in a range of the remaining resource blocks of the first group, which have not been allocated, can be allocated. In this case, in the allocation of the available resource blocks, the bitmap is set as "001100011111".

In the example on the lower side of FIG. 12D, the number of resource blocks of the first group, which is the same number of resource blocks in the example in the upper part, are allocated. However, since successive resource blocks, which have not been allocated, start at locations of resource blocks of odd-numbered indexes, resource blocks 3, 8, 9, 10, and 11 of the second group can be allocated. That is, even though a pair of resource blocks 5 and 6 of the first group, a pair of resource blocks 7 and 8, and a pair of resource blocks 15 and 16 are not allocated in the first group, the pair of resource blocks, 5, 6, 7, 8, 15, and 16 cannot be allocated in the second group since there is no index to indicate them. In this case, in the allocation of the available resource blocks, the bitmap is set as "000100001111". That is, although 10 resource blocks are allocated in the first group in both the upper and lower examples, the number of available resource blocks in the second group may vary depending on the locations of the allocated resource blocks. In other words, 7 resource blocks can be used in the second group in the example in the upper part, and 5 resource blocks can be used in the second group in the example in the lower part. That is, due to the non-use of the shift index, the number of available resource blocks in the second group may be reduced according to the situation of resource block allocation of the first group.

FIG. 12E illustrates the case where the shift index is used in the situation in which the resource blocks of the first group are allocated equally to the lower example in FIG. 12D. Referring to FIG. 12E, resource blocks of the second group are indexed from 0 to 11 such that resource block 0 of the second group starts at resource block 0 of the first group in the indexing rule 1216-0, and the resource blocks of the second group are indexed from 0 to 11 such that resource block 0 of the second group starts at resource block 1 of the first group in an indexing rule 1216-1. In this case, based on the indexing rule 1216-1, 7 resource blocks, namely resource blocks 2, 3, 7, 8, 9, 10, and 11, can be used. That is, the same number of resource blocks can be used as in the upper example in FIG. 12D. In this case, in the allocation of the available resource blocks, the bitmap is set as "001100011111" and the shift index is set as "1."

FIG. 12F illustrates the case where successive resource blocks, which have not been allocated in the first group, start at the location of a source block of an odd-numbered index, and other successive resource blocks, which have not been allocated in the first group, start at the location of a resource block of an even-numbered index. Referring to FIG. 12F, resource blocks 0, 1, 2, 3, 9, 10, 11, 12, 13, and 14 are allocated in the first group. At this time, when only one indexing rule 1216-0 is used, 6 resource blocks, namely resource blocks 2, 3, 8, 9, 10, and 11, can be used in the second group. In this case, in the allocation of the available resource blocks, the bitmap is set as "001100001111." However, when both the indexing rules 1216-0 and 1216-1 using the shift index are used, resource blocks 2 and 3, based on the indexing rule 1216-0, and 7 resource blocks, including 7, 8, 9, 10, and 11, based on the indexing rule 1216-1, can be used. In this case, in the allocation of resource blocks 2 and 3 based on the indexing rule 1216-0, the bitmap is set as "001100000000" and the shift index is set as "0." Further, in the allocation of resource blocks 7, 8, 9, 10, and 11 based on the indexing rule 1216-1, the bitmap is set as "000000011111" and the shift index is set as "1."

As described above, through the use of the shift index, the number of available resource blocks can be increased. Here, the number of bits for expressing the shift index may be determined based on the subcarrier interval of the corresponding group and the minimum value of subcarrier intervals of groups using the same band. Alternatively, the number of bits for expressing the shift index may be determined based on the subcarrier interval of the corresponding group and the basic subcarrier interval of the group. For example, the number of bits for expressing the shift index may be determined as Equation (1) or Equation (2). Equation (1) is given by:

$$N_{SI} = \log_2\left(\frac{SCS}{SCS_{min}}\right) \qquad \text{Equation (1)}$$

In Equation (1), $N_{SI}$ denotes the number of shift indexes, SCS denotes the subcarrier interval of a group using the shift index, and $SCS_{min}$ denotes the minimum value of subcarrier intervals of groups using the same band. Equation (2) is given by:

$$N_{SI} = \log_2\left(\frac{SCS}{SCS_{default}}\right) \quad \text{Equation (2)}$$

In Equation (2), $N_{SI}$ denotes the number of shift indexes, SCS denotes the subcarrier interval of a group using the shift index, and $SCS_{default}$ denotes the basic subcarrier interval of the corresponding group.

Figure 12G:
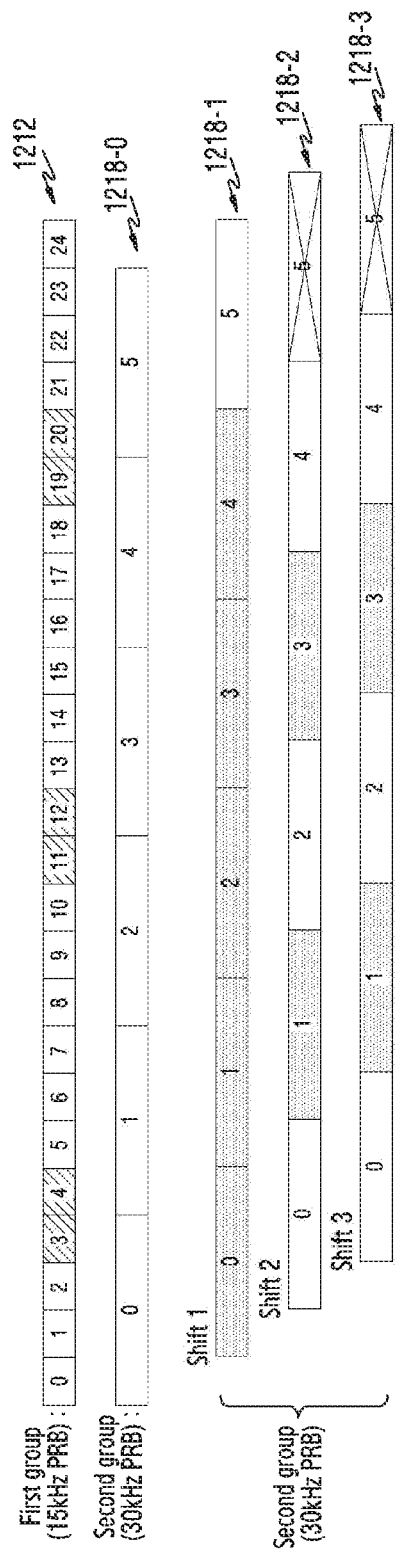

FIG. 12G illustrates resource block indexing and changes in available resource blocks in the situation where the first group, supporting a subcarrier interval of 15 kHz, and the second group, supporting a subcarrier interval of 60 kHz, share the same band. One resource block of the first group includes one frequency unit, and one resource block of the second group includes four frequency units.

Referring to FIG. 12G, resource blocks of the first group are indexed from 0 to 24 in the indexing rule 1212. Resource blocks of the second group are indexed from 0 to 5 such that resource block 0 of the second group starts at resource block 0 of the first group in an indexing rule 1218-0. The resource blocks of the second group are indexed from 0 to 5 such that resource block 0 of the second group starts at resource block 1 of the first group in an indexing rule 1218-1. The resource blocks of the second group are indexed from 0 to 4 such that resource block 0 of the second group starts at resource block 2 of the first group in an indexing rule 1218-2. The resource blocks of the second group are indexed from 0 to 4 such that resource block 0 of the second group starts at resource block 3 of the first group in an indexing rule 1218-3. That is, the resource blocks indicated by the indexing rule 1218-1 are defined at locations shifted by one frequency unit compared to the resource blocks indicated by the indexing rule 1218-0, the resource blocks indicated by the indexing rule 1218-2 are defined at locations shifted by one frequency unit compared to the resource blocks indicated by the indexing rule 1218-1, and the resource blocks indicated by the indexing rule 1218-3 are defined at locations shifted by one frequency unit compared to the resource blocks indicated by the indexing rule 1218-2.

In the first group, resource blocks 3, 4, 11, 12, 19, and 20 are allocated. When only the indexing rule 1218-0 is used, there is no available resource block in the second group. However, when the four indexing rules 1218-0, 1218-1, 1218-2, and 1218-3 are used, 7 resource blocks, namely resource blocks 1, 3, and 5 based on the indexing rule 1218-1, resource blocks 1 and 3 based on the indexing rule 1218-2, and resource blocks 1 and 3 based on the indexing rule 1218-3, can be used. However, the maximum number of resource blocks that can be allocated at the same time is 3.

The above-described embodiments are relevant to the case where the resource allocation indicates indexes of the resource blocks. However, the resource allocation information may indicate the resource block group rather than the resource block. When a group supporting a relatively small subcarrier interval among groups that share the same band adopts resource allocation based on the resource block group, the resource allocation units of the groups may be the same. The case where the first group adopts the resource allocation based on the resource block group will be described below with reference to FIGS. 12H and 12I.

Figure 12H:
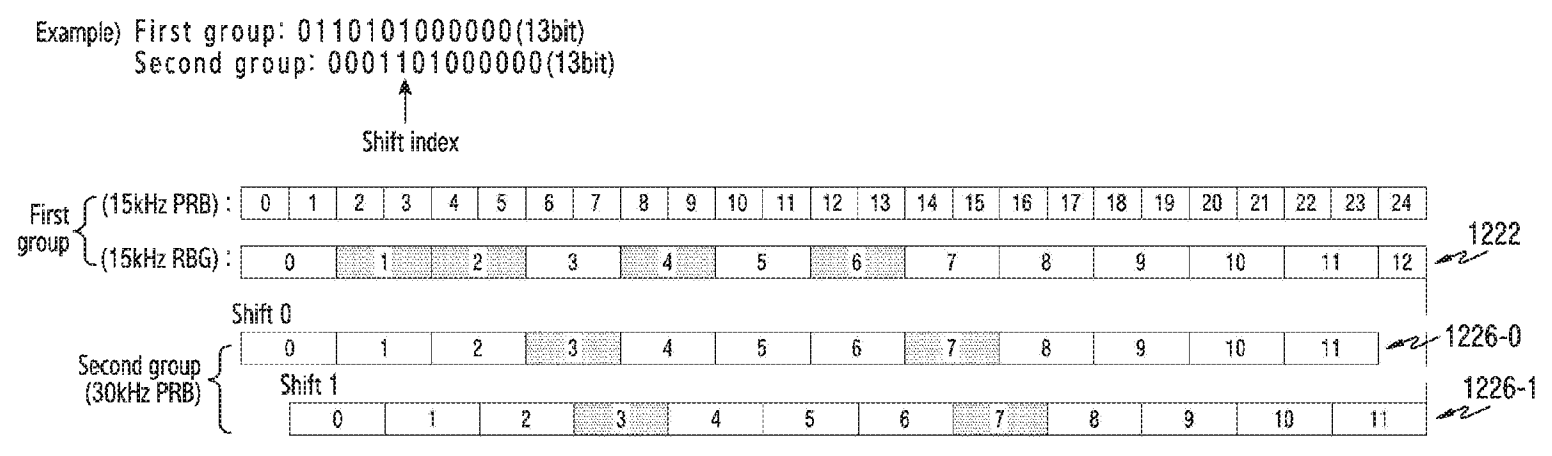
Figure 12I:
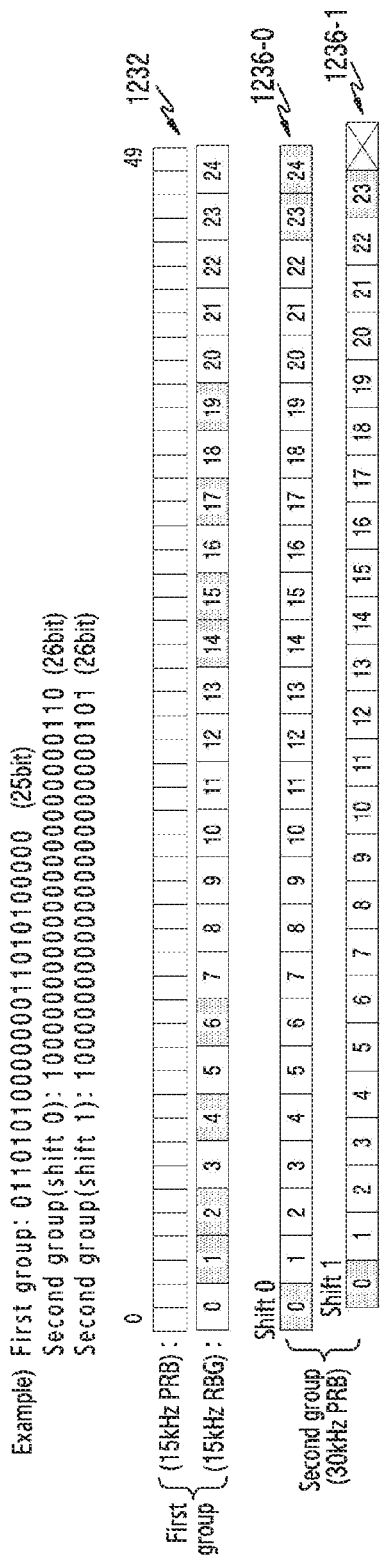

FIGS. 12H and 12I illustrate the distribution of resource blocks or resource block groups indicated by resource allocation information in the situation where the first group supporting a subcarrier interval of 15 kHz and the second group supporting a subcarrier interval of 30 kHz share the same band. One resource block group of the first group includes two resource blocks, and the size of the resource block group of the first group is the same as the size of the resource block of the second group.

FIG. 12H illustrates the case where 25 resource blocks are defined in the band of the first group. Referring to FIG. 12H, resource block groups of the first group are indexed from 0 to 12 in an indexing rule 1222. Resource blocks of the second group are indexed from 0 to 11 such that resource block 0 of the second group starts at resource block 0 of the first group in an indexing rule 1226-0. The resource blocks of the second group are indexed from 0 to 11 such that resource block 0 of the second group starts at resource block 1 of the first group in an indexing rule 1226-1. The bitmap of the resource allocation information for the first group is "0110101000000," which indicates resource block groups 1, 2, 4, and 6 of the first group. The bitmap of the resource allocation information for the second group is "000100010000," which indicates resource blocks 3 and 7. However, the physical locations of the resource blocks indicated by the bitmap may vary depending on the value of the shift index. In FIG. 12H, the shift index is "0," and accordingly, the bitmap indicates resource blocks 3 and 7 based on the indexing rule 1226-0.

FIG. 12I illustrates the case where 50 resource blocks are defined in the first group. Referring to FIG. 12I, 25 resource block groups of the first group are indexed from 0 to 24 in an indexing rule 1232. Resource blocks of the second group are indexed from 0 to 24 such that resource block 0 of the second group starts at resource block 0 of the first group in an indexing rule 1236-0. The resource blocks of the second group are indexed from 0 to 23 such that resource block 0 of the second group starts at resource block 1 of the first group in an indexing rule 1236-1. The bitmap of the resource allocation information for the first group is "01101010000000011010100000," which indicates resource block groups 1, 2, 4, 6, 14, 15, 17, and 19 of the first group. When the bitmap of the resource allocation information for the second group is "1000000000000000000000011" and the shift index is "0," the bitmap of the resource allocation information indicates resource blocks 0, 23, and 24 based on the indexing rule 1236-0. Further, when the bitmap of the resource allocation information for the second group is "1000000000000000000000010" and the shift index is "1," the bitmap of the resource allocation indicates resource blocks 0 and 23 based on the indexing rule 1236-1.

Figure 13:
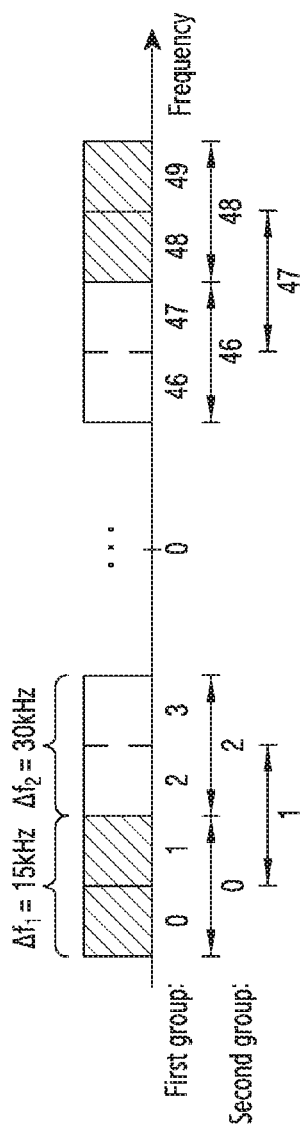
FIG. 13 illustrates unified indexing for resource blocks in the wireless communication system according to various embodiments of the present disclosure.

FIG. 13 illustrates unified indexing for resource blocks in the wireless communication system according to various embodiments of the present disclosure. FIG. 13 shows the case where a subcarrier interval of the first group is 15 kHz and a subcarrier interval of the second group is 30 kHz. In FIG. 13, the size of the resource block is defined as the number of subcarriers, and accordingly, the size of the resource block for the first group is 180 kHz and the size of the resource block for the second group is 360 kHz.

Referring to FIG. 13, resource blocks are indexed based on a minimum value of the subcarrier intervals supported in the same band. In FIG. 13, since the subcarrier interval of the first group is smaller than the subcarrier interval of the second group, the indexing is performed based on the resource blocks of the first group. Accordingly, each of the resource blocks of the second group includes frequency units corresponding to two indexes. Therefore, when the resource block of the second group is indicated, at least one of the indexes of the two frequency units included in the indicated resource block may be used. For example, as illustrated in the example of FIG. 13, the minimum value of the indexes may be used to indicate the resource block in the second group. In this case, in the second group, the index may be understood as indicating the start location of the resource block, and may be referred to as a "resource block start location indicator," a "resource block start location index," a "resource block start location number," or another term having a technical meaning equivalent thereto.

The resource blocks may be indexed based on the above-described indexing rules. Accordingly, the terminal may determine the physical locations of the resource blocks according to indexes of the resource blocks, and analyze signals.

When the independent indexing is performed according to each group, the subcarrier interval of the first group is 15 kHz, and the subcarrier interval of the second group is larger than 15 kHz, the central frequency of a first subcarrier of resource block k may be determined as Equation (3) given by:

$$f_{RBk} = \left( -\frac{N_{RB,i} N_{SC,i}^{RB}}{2} + N_{SC,i}^{RB} \cdot k \right) \cdot \Delta f_1, \; i = 1, 2 \qquad \text{Equation (3)}$$

In Equation (3), $f_{RBk}$, denotes the central frequency of a first subcarrier of resource block k, $N_{RB,i}$ denotes the number of resource blocks of group i, $N_{SC,i}^{RB}$ denotes the number of subcarriers per resource block of group i, k denotes a resource block index, and $\Delta f_i$ denotes a subcarrier interval of group i.

Further, when the independent indexing is performed according to each group, the subcarrier interval of the first group is 15 kHz, and the subcarrier interval of the second group is larger than 15 kHz, the central frequency of the first subcarrier of resource block k may be determined as Equation (4) given by:

$$f_{RBk} = \Delta f_i + 180 \cdot k \qquad \text{Equation (4)}$$

In Equation (4), $f_{RBk}$ denotes the central frequency of a first subcarrier of resource block k, $\Delta f_i$ denotes a subcarrier interval of group i, and k denotes a resource block index.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) in a wireless communication system, the BS comprising:
   at least one processor configured to generate a first synchronization signal and a first broadcast signal for a first group that supports a first numerology, and a second synchronization signal and a second broadcast signal for a second group that supports a second numerology; and
   a transceiver configured to:
      transmit the first synchronization signal and the first broadcast signal over a first channel allocated for the first group, and the second synchronization signal and the second broadcast signal over a second channel allocated for the second group, and
      transmit information for indicating first resource blocks for the first group and second resource blocks for the second group,
   wherein the first numerology and the second numerology include different subcarrier intervals,
   wherein the first broadcast signal includes at least one of information associated with a central frequency of a system bandwidth of the first group or information associated with a frame boundary of the first group, and
   wherein the first resource blocks for the first group and the second resource blocks for the second group are indicated by using identical indexes.

2. The BS of claim 1, wherein the information associated with the central frequency includes an offset on a frequency axis of a center of the first channel for the central frequency.

3. The BS of claim 1, wherein the information associated with the frame boundary includes an offset on a time axis of the first channel for the frame boundary.

4. The BS of claim 1, wherein the first group and the second group share the system bandwidth, and wherein the first channel and the second channel are allocated to different resources on at least one of a frequency axis or a time axis.

5. The BS of claim 1, wherein the second group uses another system bandwidth included in the system bandwidth of the first group, and wherein a first signal includes information associated with the other system bandwidth.

6. The BS of claim 5, wherein the information associated with the other system bandwidth includes at least one of information indicating a resource group including resources belonging to the other system bandwidth, information indicating a location of the resources in the resource group, or information indicating a size of the resources.

7. The BS of claim 1, wherein the second group uses another system bandwidth included in the system bandwidth of the first group, and wherein resource blocks for the first group are indexed except for resources belonging to the other system bandwidth.

8. The BS of claim 1, wherein the first group and the second group share at least an amount of bands of the system bandwidth, wherein a resource block size of the first group is an integer multiple of a resource block size of the second group, and wherein resource blocks of the first group include a first resource block set, indexed such that a first resource block of the first group starts at a same location as a first resource block of the second group, and a second resource block set, indexed such that the first resource block of the first group starts at a same location as a second resource block of the second group.

9. A terminal in a wireless communication system, the terminal comprising:
a transceiver; and
at least one processor operably coupled to the transceiver, the at least one processor configured to:
receive, from a base station, a first synchronization signal and a first broadcast signal, among the first synchronization signal and the first broadcast signal for a first group that supports a first numerology and a second synchronization signal and a second broadcast signal for a second group that supports a second numerology,
identify a system bandwidth of the first group and information on a frame based on the first broadcast signal, and
identify first resource blocks for the first group based on information received from the base station for indicating the first resource blocks for the first group and second resource blocks for the second group,
wherein the first numerology and the second numerology include different subcarrier intervals,
wherein the first broadcast signal includes at least one of information associated with a central frequency of the system bandwidth of the first group or information associated with a frame boundary of the first group, and
wherein the first resource blocks for the first group and the second resource blocks for the second group are indicated by using identical indexes.

10. The terminal of claim 9, wherein the information associated with the central frequency includes an offset on a frequency axis of a center of a first channel for the central frequency.

11. The terminal of claim 9, wherein the information associated with the frame boundary includes an offset on a time axis of a first channel for the frame boundary.

12. The terminal of claim 9, wherein the first group and the second group share the system bandwidth, and wherein a first channel and a second channel are allocated to different resources on at least one of a frequency axis or a time axis.

13. The terminal of claim 9, wherein the second group uses another system bandwidth included in the system bandwidth of the first group, and wherein a first signal includes information associated with the other system bandwidth.

14. The terminal of claim 13, wherein the information associated with the other system bandwidth includes at least one of information indicating a resource group including resources belonging to the other system bandwidth, information indicating a location of the resources in the resource group, or information indicating a size of the resources.

15. The terminal of claim 9, wherein the second group uses another system bandwidth included in the system bandwidth of the first group, and wherein resource blocks for the first group are indexed except for resources belonging to the other system bandwidth.

16. The terminal of claim 9, wherein the first group and the second group share at least an amount of bands of the system bandwidth, wherein a resource block size of the first group is an integer multiple of a resource block size of the second group, and wherein resource blocks of the first group include a first resource block set, indexed such that a first resource block of the first group starts at a same location as a first resource block of the second group, and a second resource block set, indexed such that the first resource block of the first group starts at a same location as a second resource block of the second group.

17. A method for operating a terminal in a wireless communication system, the method comprising:
receiving, from a base station, a first synchronization signal and a first broadcast signal, among the first synchronization signal and the first broadcast signal for a first group that supports a first numerology and a second synchronization signal and a second broadcast signal for a second group that supports a second numerology;
identifying a system bandwidth of the first group and information on a frame based on the first broadcast signal; and
identifying first resource blocks for the first group based on information received from the base station for indicating the first resource blocks for the first group and second resource blocks for the second group,
wherein the first numerology and the second numerology include different subcarrier intervals,
wherein the first broadcast signal includes at least one of information associated with a central frequency of the system bandwidth of the first group or information associated with a frame boundary of the first group, and
wherein the first resource blocks for the first group and the second resource blocks for the second group are indicated by using identical indexes.

18. The method of claim 17, wherein the information associated with the central frequency includes an offset on a frequency axis of a center of a first channel for the central frequency.

* * * * *